US012193990B2

(12) United States Patent
Prestezog et al.

(10) Patent No.: US 12,193,990 B2
(45) Date of Patent: Jan. 14, 2025

(54) COMPRESSION BELT ASSEMBLY FOR A CHEST COMPRESSION DEVICE

(71) Applicant: ZOLL Circulation, Inc., San Jose, CA (US)

(72) Inventors: Anna G. Prestezog, San Jose, CA (US); David T. Lawrence, San jose, CA (US)

(73) Assignee: ZOLL Circulation, Inc., San Jose, CA (US)

( * ) Notice: Subject to any disclaimer, the term of this patent is extended or adjusted under 35 U.S.C. 154(b) by 228 days.

(21) Appl. No.: 17/562,706

(22) Filed: Dec. 27, 2021

(65) Prior Publication Data

US 2022/0192920 A1 Jun. 23, 2022

Related U.S. Application Data

(63) Continuation of application No. 16/164,643, filed on Oct. 18, 2018, now Pat. No. 11,246,795, which is a (Continued)

(51) Int. Cl.
*A61H 31/00* (2006.01)
*A61H 1/00* (2006.01)
*A61H 11/00* (2006.01)

(52) U.S. Cl.
CPC ............ *A61H 31/006* (2013.01); *A61H 1/00* (2013.01); *A61H 31/00* (2013.01); *A61H 31/005* (2013.01); *A61H 31/007* (2013.01); *A61H 2011/005* (2013.01); *A61H 2201/0173* (2013.01); *A61H 2201/0192* (2013.01); (Continued)

(58) Field of Classification Search
CPC ........ A61H 31/006; A61H 1/00; A61H 31/00; A61H 31/005; A61H 31/007; A61H 2011/005; A61H 2201/0173; A61H 2201/0192; A61H 2201/1207; A61H 2201/1621; A61H 2201/50; A61H 2201/5023; A61H 2201/5028; A61H 2201/5043; A61H 2201/5058; (Continued)

(56) References Cited

U.S. PATENT DOCUMENTS

| | | | |
|---|---|---|---|
| 443,204 | A | 12/1890 | Davis |
| 651,962 | A | 6/1900 | Boghean |

(Continued)

FOREIGN PATENT DOCUMENTS

| | | | |
|---|---|---|---|
| EP | 3335941 | 6/2018 | |
| EP | 3335941 A1 * | 6/2018 | ............ B60R 22/18 |

(Continued)

OTHER PUBLICATIONS

Notice of Allowance mailed in related U.S. Appl. No. 16/164,643 dated Sep. 29, 2021.

(Continued)

*Primary Examiner* — Kendra D Carter
*Assistant Examiner* — Arielle Wolff
(74) *Attorney, Agent, or Firm* — Finch & Maloney PLLC

(57) ABSTRACT

A chest compression device with a chest compression belt assembly including guards and sensors operable with a control system to control operation of the system depending on detection of proper installation of the guards.

16 Claims, 11 Drawing Sheets

Related U.S. Application Data continuation-in-part of application No. 15/942,292, filed on Mar. 30, 2018, now Pat. No. 10,874,583.

(60) Provisional application No. 62/747,124, filed on Oct. 17, 2018, provisional application No. 62/488,051, filed on Apr. 20, 2017.

(52) U.S. Cl.
CPC ................ *A61H 2201/1207* (2013.01); *A61H 2201/1621* (2013.01); *A61H 2201/50* (2013.01); *A61H 2201/5023* (2013.01); *A61H 2201/5028* (2013.01); *A61H 2201/5043* (2013.01); *A61H 2201/5058* (2013.01); *A61H 2201/5066* (2013.01); *A61H 2201/5092* (2013.01); *A61H 2203/0456* (2013.01); *A61H 2205/084* (2013.01)

(58) Field of Classification Search
CPC .... A61H 2201/5066; A61H 2201/5092; A61H 2203/0456; A61H 2205/084
See application file for complete search history.

(56) References Cited

U.S. PATENT DOCUMENTS 2,071,215 A 2/1937 Petersen
2,255,684 A 9/1941 Smith
2,486,667 A 11/1949 Meister
2,699,163 A 1/1955 Engstrom
2,754,817 A 7/1956 Nemeth
2,780,222 A 2/1957 Polzin et al.
2,853,998 A 9/1958 Emerson
2,899,955 A 8/1959 Huxley, III et al.
2,910,264 A 10/1959 Lindenberger
3,042,024 A 7/1962 Mendelson
3,095,873 A 7/1963 Edmunds
3,120,228 A 2/1964 Huxley, III
3,359,851 A 12/1967 Lipschutz et al.
3,368,550 A 2/1968 Glascock
3,374,783 A 3/1968 Hurvitz
3,461,860 A 8/1969 Barkalow et al.
3,481,327 A 12/1969 Drennen
3,503,388 A 3/1970 Cook
3,514,065 A 5/1970 Donaldson et al.
3,586,760 A 6/1971 Dillenburger
3,718,751 A 2/1973 Landre et al.
3,748,471 A 7/1973 Ross et al.
3,753,822 A 8/1973 Heinrich
3,777,744 A 12/1973 Fryfogle et al.
3,782,371 A 1/1974 Derouineau
3,802,638 A 4/1974 Dragan
3,822,840 A 7/1974 Stephenson
3,835,847 A 9/1974 Smith
3,896,797 A 7/1975 Bucur
3,902,480 A 9/1975 Wilson
4,004,579 A 1/1977 Dedo
4,058,124 A 11/1977 Yen et al.
4,155,537 A 5/1979 Bronson et al.
4,185,902 A 1/1980 Plaot
4,241,675 A 12/1980 Bardsley
4,241,676 A 12/1980 Parsons et al.
4,273,114 A 6/1981 Barkalow et al.
4,291,686 A 9/1981 Miyashiro
4,315,906 A 2/1982 Gelder
4,338,924 A 7/1982 Bloom
4,349,015 A 9/1982 Alferness
4,365,623 A 12/1982 Wilhelm et al.
4,397,306 A 8/1983 Weisfeldt et al.
4,409,614 A 10/1983 Eichler et al.
4,424,806 A 1/1984 Newman et al.
4,453,538 A 6/1984 Whitney
4,471,898 A 9/1984 Parker
4,477,807 A 10/1984 Nakajima et al.
4,491,078 A 1/1985 Ingram
4,522,132 A 6/1985 Slattery
4,540,427 A 9/1985 Helbling
4,570,615 A 2/1986 Barkalow
4,619,265 A 10/1986 Morgan et al.
4,655,312 A 4/1987 Frantom et al.
4,664,098 A 5/1987 Woudenberg et al.
4,739,717 A 4/1988 Bardsley
4,753,226 A 6/1988 Zheng et al.
4,770,164 A 9/1988 Lach et al.
4,827,334 A 5/1989 Johnson et al.
4,835,777 A 5/1989 DeLuca et al.
4,915,095 A 4/1990 Chun
4,928,674 A 5/1990 Halperin et al.
4,930,517 A 6/1990 Cohen et al.
4,987,783 A 1/1991 D'Antonio et al.
5,014,141 A 5/1991 Gervais et al.
5,025,794 A 6/1991 Albert et al.
5,043,718 A 8/1991 Shimura
5,056,505 A 10/1991 Warwick et al.
5,075,684 A 12/1991 DeLuca
5,093,659 A 3/1992 Yamada
5,098,369 A 3/1992 Heilman et al.
5,140,561 A 8/1992 Miyashita et al.
5,184,606 A 2/1993 Csorba
5,217,010 A 6/1993 Tsitlik et al.
5,222,478 A 6/1993 Scarberry et al.
5,228,449 A 7/1993 Christ et al.
5,257,619 A 11/1993 Everete
5,262,958 A 11/1993 Chui et al.
5,277,194 A 1/1994 Hosterman et al.
5,287,846 A 2/1994 Capjon et al.
5,295,481 A 3/1994 Geeham
5,318,262 A 6/1994 Adams
5,327,887 A 7/1994 Nowakowski
5,359,999 A 11/1994 Kinsman
5,370,603 A 12/1994 Newman
5,372,487 A 12/1994 Pekar
5,399,148 A 3/1995 Waide et al.
5,402,520 A 3/1995 Schnitta
5,405,362 A 4/1995 Kramer et al.
5,411,518 A 5/1995 Goldstein et al.
5,421,342 A 6/1995 Mortara
5,451,202 A 9/1995 Miller et al.
5,474,533 A 12/1995 Ward et al.
5,474,574 A 12/1995 Payne et al.
5,490,820 A 2/1996 Schock et al.
5,496,257 A 3/1996 Kelly
5,513,649 A 5/1996 Gevins et al.
5,520,622 A 5/1996 Bastyr et al.
5,524,843 A 6/1996 McCauley
5,582,580 A 12/1996 Buckman et al.
5,593,426 A 1/1997 Morgan et al.
5,620,001 A 4/1997 Byrd et al.
5,630,789 A 5/1997 Schock et al.
5,660,182 A 8/1997 Kuroshaki et al.
5,664,563 A 9/1997 Schroeder et al.
5,704,365 A 1/1998 Albrecht et al.
5,738,637 A 4/1998 Kelly et al.
5,743,864 A 4/1998 Baldwin, II
5,769,800 A 6/1998 Gelfand et al.
5,806,512 A 9/1998 Abramov et al.
5,831,164 A 11/1998 Reddi et al.
5,860,706 A 1/1999 Fausel
5,876,350 A 3/1999 Lo et al.
5,960,523 A * 10/1999 Husby .............. B60R 21/01546
24/642
5,978,693 A 11/1999 Hamilton et al.
5,999,852 A 12/1999 Elabbady et al.
6,016,445 A 1/2000 Baura
6,066,106 A 5/2000 Sherman et al.
6,090,056 A 7/2000 Bystrom et al.
6,125,299 A 9/2000 Groenke et al.
6,142,962 A 11/2000 Mollenauer et al.
6,171,267 B1 1/2001 Baldwin, II
6,174,295 B1 1/2001 Cantrell et al.
6,213,960 B1 4/2001 Sherman et al.
6,263,238 B1 7/2001 Brewer et al.
6,306,107 B1 10/2001 Myklebust et al.

(56) References Cited

U.S. PATENT DOCUMENTS

| | | | |
|---|---|---|---|
| 6,344,623 | B1 | 2/2002 | Yamazaki et al. |
| 6,360,602 | B1 | 3/2002 | Tazartes et al. |
| 6,366,811 | B1 | 4/2002 | Carlson |
| 6,367,478 | B1 | 4/2002 | Riggs |
| 6,390,996 | B1 | 5/2002 | Halperin et al. |
| 6,398,745 | B1 | 6/2002 | Sherman et al. |
| 6,411,843 | B1 | 6/2002 | Zarychta |
| 6,447,465 | B1 | 9/2002 | Sherman et al. |
| 6,453,272 | B1 | 9/2002 | Slechta |
| 6,599,258 | B1 | 7/2003 | Bystrom et al. |
| 6,616,620 | B2 | 9/2003 | Sherman et al. |
| 6,640,134 | B2 | 10/2003 | Raymond et al. |
| 6,647,287 | B1 | 11/2003 | Peel, III et al. |
| 6,690,616 | B1 | 2/2004 | Bahr et al. |
| 6,709,410 | B2 | 3/2004 | Sherman et al. |
| 6,807,442 | B1 | 10/2004 | Myklebust et al. |
| 6,869,408 | B2 | 3/2005 | Sherman et al. |
| 6,939,314 | B2 | 9/2005 | Hall et al. |
| 6,939,315 | B2 | 9/2005 | Sherman et al. |
| 7,104,967 | B2 | 9/2006 | Rothman et al. |
| 7,108,665 | B2 | 9/2006 | Halperin et al. |
| 7,220,235 | B2 | 5/2007 | Geheb et al. |
| 7,226,427 | B2 | 6/2007 | Steen |
| 7,270,639 | B2 | 9/2007 | Jensen et al. |
| 7,347,832 | B2 | 3/2008 | Jensen et al. |
| 7,354,407 | B2 | 4/2008 | Quintana et al. |
| 7,374,548 | B2 | 5/2008 | Sherman et al. |
| 7,404,803 | B2 | 7/2008 | Katz et al. |
| 7,410,470 | B2 | 8/2008 | Escudero et al. |
| 7,429,250 | B2 | 9/2008 | Halperin et al. |
| 7,517,325 | B2 | 4/2009 | Halperin |
| 7,569,021 | B2 | 8/2009 | Sebelius et al. |
| 7,602,301 | B1 | 10/2009 | Stirling et al. |
| 7,666,153 | B2 | 2/2010 | Hall et al. |
| 7,841,996 | B2 | 11/2010 | Sebelius et al. |
| 8,062,239 | B2 | 11/2011 | Sherman et al. |
| 8,641,647 | B2 | 2/2014 | Illindala et al. |
| 8,690,804 | B2 | 4/2014 | Nilsson et al. |
| 8,753,298 | B2 | 6/2014 | Sebelius et al. |
| 10,874,583 | B2 | 12/2020 | Joshi et al. |
| 11,246,795 | B2 | 2/2022 | Prestezog et al. |
| 2001/0011159 | A1 | 8/2001 | Cantrell et al. |
| 2001/0018562 | A1 | 8/2001 | Sherman et al. |
| 2001/0047140 | A1 | 11/2001 | Freeman |
| 2002/0026131 | A1 | 2/2002 | Halperin |
| 2002/0055694 | A1 | 5/2002 | Halperin et al. |
| 2002/0077560 | A1 | 6/2002 | Kramer et al. |
| 2002/0088893 | A1 | 7/2002 | Nichols |
| 2002/0133197 | A1 | 9/2002 | Snyder et al. |
| 2002/0147534 | A1 | 10/2002 | Delcheccolo et al. |
| 2003/0009115 | A1* | 1/2003 | Sherman ................ A61H 31/00 601/44 |
| 2003/0171661 | A1 | 9/2003 | Tong |
| 2003/0181834 | A1 | 9/2003 | Sebelius et al. |
| 2004/0030272 | A1 | 2/2004 | Kelly et al. |
| 2004/0087839 | A1 | 5/2004 | Raymond et al. |
| 2004/0116840 | A1 | 6/2004 | Cantrell et al. |
| 2004/0162510 | A1 | 8/2004 | Jayne et al. |
| 2004/0210172 | A1 | 10/2004 | Palazzolo et al. |
| 2004/0220501 | A1 | 11/2004 | Kelly et al. |
| 2005/0080362 | A1* | 4/2005 | Quintana ............. A61H 31/005 601/44 |
| 2007/0010764 | A1 | 1/2007 | Palazzolo et al. |
| 2007/0270725 | A1 | 11/2007 | Sherman et al. |
| 2007/0276298 | A1 | 11/2007 | Sebelius et al. |
| 2008/0119766 | A1 | 5/2008 | Havardsholm et al. |
| 2008/0146975 | A1 | 6/2008 | Ho et al. |
| 2008/0255481 | A1 | 10/2008 | Quintana et al. |
| 2008/0300518 | A1 | 12/2008 | Bowes |
| 2009/0187123 | A1 | 7/2009 | Hwang et al. |
| 2009/0204035 | A1 | 8/2009 | Mollenauer et al. |
| 2009/0204036 | A1 | 8/2009 | Halperin |
| 2009/0260637 | A1 | 10/2009 | Sebelius et al. |
| 2010/0004571 | A1 | 1/2010 | Nilsson et al. |
| 2010/0004572 | A1 | 1/2010 | King |
| 2010/0063425 | A1 | 3/2010 | King et al. |
| 2010/0185127 | A1 | 7/2010 | Nilsson et al. |
| 2011/0040217 | A1 | 2/2011 | Centen |
| 2011/0201979 | A1 | 8/2011 | Voss et al. |
| 2011/0308534 | A1 | 12/2011 | Sebelius et al. |
| 2011/0319797 | A1 | 12/2011 | Sebelius et al. |
| 2012/0083720 | A1 | 4/2012 | Centen et al. |
| 2012/0226205 | A1 | 9/2012 | Sebelius et al. |
| 2012/0238922 | A1 | 9/2012 | Stemple et al. |
| 2012/0283608 | A1 | 11/2012 | Nilsson et al. |
| 2013/0060172 | A1 | 3/2013 | Palazzolo et al. |
| 2013/0060173 | A1 | 3/2013 | Palazzolo et al. |
| 2013/0123673 | A1 | 5/2013 | Sherman et al. |
| 2013/0218055 | A1 | 8/2013 | Fossan |
| 2014/0121576 | A1 | 5/2014 | Nilsson et al. |
| 2014/0155793 | A1 | 6/2014 | Illindala et al. |
| 2014/0180180 | A1 | 6/2014 | Nilsson et al. |
| 2014/0207031 | A1 | 7/2014 | Sebelius et al. |
| 2014/0236054 | A1 | 8/2014 | Jensen et al. |
| 2014/0273608 | A1* | 9/2014 | Whetstone ......... H01R 13/6683 439/488 |
| 2014/0276269 | A1 | 9/2014 | Ilindala |
| 2014/0303530 | A1 | 10/2014 | Nilsson et al. |
| 2014/0343466 | A1 | 11/2014 | Herken et al. |
| 2015/0057580 | A1 | 2/2015 | Illindala |
| 2015/0094624 | A1 | 4/2015 | Ilindala |
| 2015/0105705 | A1 | 4/2015 | Freeman |
| 2015/0148717 | A1 | 5/2015 | Halperin |
| 2017/0105897 | A1 | 4/2017 | Joshi et al. |
| 2022/0192920 | A1 | 6/2022 | Prestezog et al. |

FOREIGN PATENT DOCUMENTS

| | | |
|---|---|---|
| KR | 1020170028578 | 3/2017 |
| WO | WO9722327 | 6/1997 |
| WO | WO0215836 | 2/2002 |
| WO | 2018/195398 A2 | 10/2018 |

OTHER PUBLICATIONS

Notice of Allowance mailed in related U.S. Appl. No. 17/121,307 dated Jun. 28, 2023.

International Search Report dated Oct. 11, 2018 from International Application No. PCT/US2018/028533 Previously submitted in related U.S. Appl. No. 16/164,643.

Non-Final Office Action issued in U.S. Appl. No. 17/121,307 dated Feb. 1, 2023.

* cited by examiner

COMPRESSION BELT ASSEMBLY FOR A CHEST COMPRESSION DEVICE

This application is a continuation of and claims priority to U.S. application Ser. No. 16/164,643 filed Oct. 18, 2018, which claims priority to U.S. Provisional Application No. 62/747,124 filed Oct. 17, 2018. U.S. application Ser. No. 16/164,643 filed Oct. 18, 2018 is also a continuation-in-part of U.S. application Ser. No. 15/942,292 filed Mar. 30, 2018 (now U.S. Pat. No. 10,874,583, issued Dec. 29, 2020), which claims priority to U.S. Provisional Application No. 62/488,051, filed Apr. 20, 2017. The above-identified applications are each hereby incorporated by reference in their entireties.

FIELD

The inventions described below relate to the field of CPR chest compression devices.

BACKGROUND

Cardiopulmonary resuscitation (CPR) is a well-known and valuable method of first aid used to resuscitate people who have suffered from cardiac arrest. CPR requires repetitive chest compressions to squeeze the heart and the thoracic cavity to pump blood through the body. In efforts to provide better blood flow and increase the effectiveness of bystander resuscitation efforts, various mechanical devices have been proposed for performing CPR. In one type of mechanical chest compression device, a belt is placed around the patient's chest and the belt is used to effect chest compressions, for example our commercial device, sold under the trademark AUTOPULSE®.

These devices have proven to be valuable alternatives to manual chest compression. The devices provide chest compressions at resuscitative rates and depths. A resuscitative rate may be any rate of compressions considered effective to induce blood flow in a cardiac arrest victim, typically 60 to 120 compressions per minute (the CPR Guidelines 2015 recommends 100 to 120 compressions per minute in adult victims), and a resuscitative depth may be any depth considered effective to induce blood flow, and typically 1.5 to 2.5 inches (the CPR Guidelines 2015 recommends 2 to 2.4 inches per compression in adults).

The AUTOPULSE® chest compression device uses a belt, which is releasably attached to a drive spool with the housing of the device. In a convenient arrangement, a spline is secured to the belt, and the spline fits into a slot in the drive spool of the device. The drive spool is accessible from the bottom, or posterior aspect, of the device. Before use, a fresh belt is fitted to the device, and this requires lifting the device to insert the spline into the drive spool. The patient is then placed on the housing of the device, and the belt is secured over the chest of the patient. Opposite ends of the belt are held together, over the chest of the patient, with hook and loop fasteners. The arrangement has proven effective for treating cardiac arrest victims and convenient to use. However, belt installation may not always be convenient.

SUMMARY

In certain embodiments, devices and methods are provided for a belt-driven chest compression device in which the compression belt is readily replaceable. The chest compression device includes a platform which houses drive components, and a compression belt which is connected to the drive components through releasably attachable couplings near the upper surface of the device. Removal and replacement of the belt may be accomplished while a patient is disposed on the housing. This arrangement helps avoid twisting of the belt and facilitates removal and replacement of the belt. The belt is tensioned upon installation by the control system that controls operation of the compression device. Also, the belt may be provided in an assembly including a liner sock, the belt, a guard slidably disposed on the belt, and/or an attachment feature or pin secured to the ends of the belt, while the housing of the device may include an aperture configured to securely receive the guard, and drive spools disposed within the housing, accessible through the apertures. Each drive spool may include a mating feature or slot for receiving a pin. A flange disposed about each drive spool, movable or slidable along the drive spool, is operable to trap the pins in the slots to keep the belt secured to the drive spools during operation.

The compression belt assembly for use with the chest compression device may comprise a compression belt, a guard slidably disposed on the compression belt, proximate the first end of the compression belt, and a sensor or sensor system component associated with the machine guard, and/or a liner sock disposed about the compression belt, and fixed to the guard. The attachment sensor or sensor system component may be interoperable with a corresponding sensor or sensor system component disposed on the chest compression device housing, or with a control system used to control the chest compression device. The control system may be operable to receive signals from the sensor or sensor system component or a corresponding sensor or sensor system component disposed on the chest compression device housing to control the device based on the signals. For example, the control system may be programmed so that it will not operate to perform chest compressions unless signals indicative of proper placement of the machine guard are transmitted to the control system.

The chest compression device may comprise a drive spool, having a first end and a second end and a motor operably connected to the belt through the drive shaft. The motor may be operably connected to the first end of the drive spool, and capable of operating the drive spool repeatedly to cause the belt to tighten about the thorax of the patient and loosen about the thorax of the patient. The drive spool may include a first spool portion having a longitudinally oriented first drive spool slot configured to receive a pin of a compression belt, and a first flange disposed proximate a first end of the spool portion. A compression belt includes a first pin secured to the belt, at the end of the belt, and extending transversely across the belt end. The first flange of the drive spool may be longitudinally translatable over the first spool portion, operable to translate to a first position along the first spool portion in which the slot is unobstructed by the flange and a second position in which the slot is partially obstructed by the flange, such that the pin is secured in the slot by the flange. A compression belt assembly for use with a chest compression device may include a compression belt, a guard slidably disposed on the compression belt wherein the guard has a moveable belt slot for slidably engaging the compression belt and the guard may be configured to occupy an aperture in a housing of the chest compression device. The moveable belt slot may be operable to move medially or laterally. The guard of the compression belt assembly may include a first portion and a second portion and an aperture through the first portion of the guard for slidably engaging the compression belt; and the compression belt assembly may also include a plate slidably disposed over the aperture in the guard, wherein the moveable belt slot for slidably engaging the compression belt may be in the plate. The plate may be operable to slide medially and laterally over the aperture in the guard. The guard of the compression belt assembly may include a plurality of rails for slidably securing the plate over the aperture in the guard. The guard of the compression belt assembly may include a hinge component for engaging a corresponding hinge component of the housing proximate the aperture, wherein the guard pivotally engages the hinge component and may be operable to pivot about the hinge component to move the belt slot medially and laterally. The compression belt assembly may include a guard slot in the housing proximate the aperture for engaging a first portion of the guard, wherein the guard may further include a first portion and a second portion, wherein the belt slot for slidably engaging the compression belt may be in the first portion, and wherein the second portion of the guard pivotally engages the hinge component and may be operable to pivot about the hinge component to move the belt slot medially and laterally while the first portion moves medially and laterally in the guard slot in the housing. The guard of the compression belt assembly may include a first portion and a second portion and sidewalls extending medially and posteriorly from the lateral portion and the anterior portion of the guard. The compression belt assembly may include a first sensor component, said first sensor component associated with the guard and configured to indicate attachment of the guard to the chest compression device. The guard of the compression belt assembly may include a first sensor component of a sensor, said first sensor component interoperable with a second sensor component disposed in the chest compression device for detection of attachment of the guard to the chest compression device. The first sensor component may be selected from a component of a magnetic sensor, a contact relay, a contact switch, a capacitive sensor, an inductive sensor, an optical sensor, and an ultrasonic sensor. The guard of the compression belt assembly may include a first sensor component of an attachment sensing system. The first sensor component of an attachment sensing system may be selected from a component of a magnetic sensor, capacitive sensor, inductive sensor, optical sensor, or ultrasonic sensor. A compression belt assembly for use with a chest compression device may include a compression belt, a guard having a first portion and a second portion and an aperture through the guard for slidably engaging the compression belt, wherein the guard may be configured to occupy an aperture in a housing of the chest compression device, and a plate having a belt slot for slidably engaging the compression belt, the plate may be slidably disposed over the aperture in the guard. The plate may be operable to slide medially and laterally over the aperture in the guard. The guard of the compression belt assembly may include a plurality of rails for slidably securing the plate over the aperture in the guard. The aperture may be operable to accommodate lateral positions of the belt as the plate and the belt slot translate laterally. The compression belt assembly may include a first sensor component, said first sensor component may be associated with the guard and configured to indicate attachment of the guard to the chest compression device. The guard may include a first sensor component of a sensor, said first sensor component may be interoperable with a second sensor component disposed in the chest compression device for detection of attachment of the guard to the chest compression device. The guard may include a first sensor component of an attachment sensing system, wherein the first sensor component of the attachment sensing system may be selected from a component of a magnetic sensor, capacitive sensor, inductive sensor, optical sensor, or ultrasonic sensor. A compression belt assembly for use with a chest compression device may include a compression belt, a guard having a first portion and a second portion and a belt slot through the guard for slidably engaging the compression belt, the guard having a hinge component on the second portion for engaging a corresponding hinge component of the housing of the chest compression device proximate an aperture in the chest compression device, and wherein the guard may be configured to occupy the aperture in the housing. The guard may pivotally engages the hinge component and may be operable to pivot about the hinge component to move the belt slot medially and laterally. The guard may include sidewalls extending medially and posteriorly from the first portion and the second portion of the guard. The compression belt assembly may include a first sensor component, said first sensor component may be associated with the guard and configured to indicate attachment of the guard to the chest compression device. The compression belt assembly may include a first sensor component of a sensor, said first sensor component may be interoperable with a second sensor component disposed in the chest compression device for detection of attachment of the guard to the chest compression device. The guard may include a first sensor component of an attachment sensing system, wherein the first sensor component of the attachment sensing system may be selected from a component of a magnetic sensor, capacitive sensor, inductive sensor, optical sensor, or ultrasonic sensor. The machine guards having a movable slot described herein may further include any of the first and or second sensor components described herein for example from a magnetic sensor, a contact relay, a contact switch, a capacitive sensor, an inductive sensor, an optical sensor, and an ultrasonic sensor.

DETAILED DESCRIPTION

Figure 1:
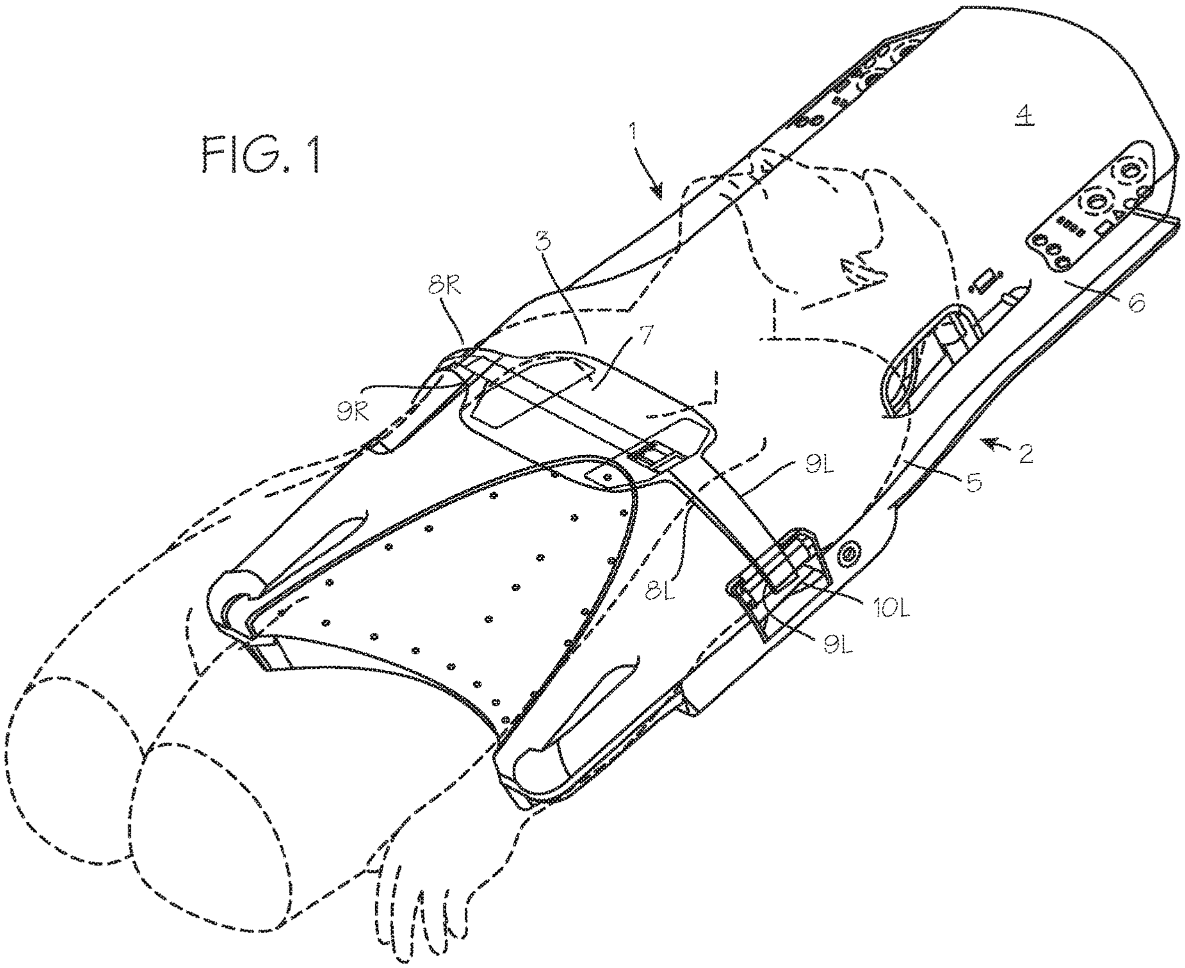
FIG. 1 illustrates the CPR chest compression device installed on a patient.

FIG. 1 shows an embodiment of a chest compression device fitted on a patient 1. The chest compression device 2 applies compressions with a compression belt or band 3. The chest compression device 2 includes a belt drive platform 4 sized for placement under the thorax of the patient, upon which the patient rests during use and which provides a housing 5 for the drive train and control system for the device. The control system, provided anywhere in the device, can include a processor and may be operable to control tightening operation of the belt and to provide output on a user interface disposed on the housing. Operation of the device can be initiated and adjusted by a user through a control panel 6 and/or a display operated by the control system to provide feedback regarding the status of the device to the user.

The compression belt includes a wide load-distribution section 7 at the mid-portion of the belt and left and right belt ends 8R and 8L (shown in the illustration as narrow pull straps 9R and 9L), which serve as tensioning portions which extend from the load distributing portion, posteriorly relative to the patient, to drive spools within the housing. When fitted on a patient, the load distribution section is disposed over the anterior chest wall of the patient, and the left and right belt ends extend posteriorly over the right and left axilla of the patient to connect to their respective lateral drive spools shown in FIG. 2.

Figure 2:
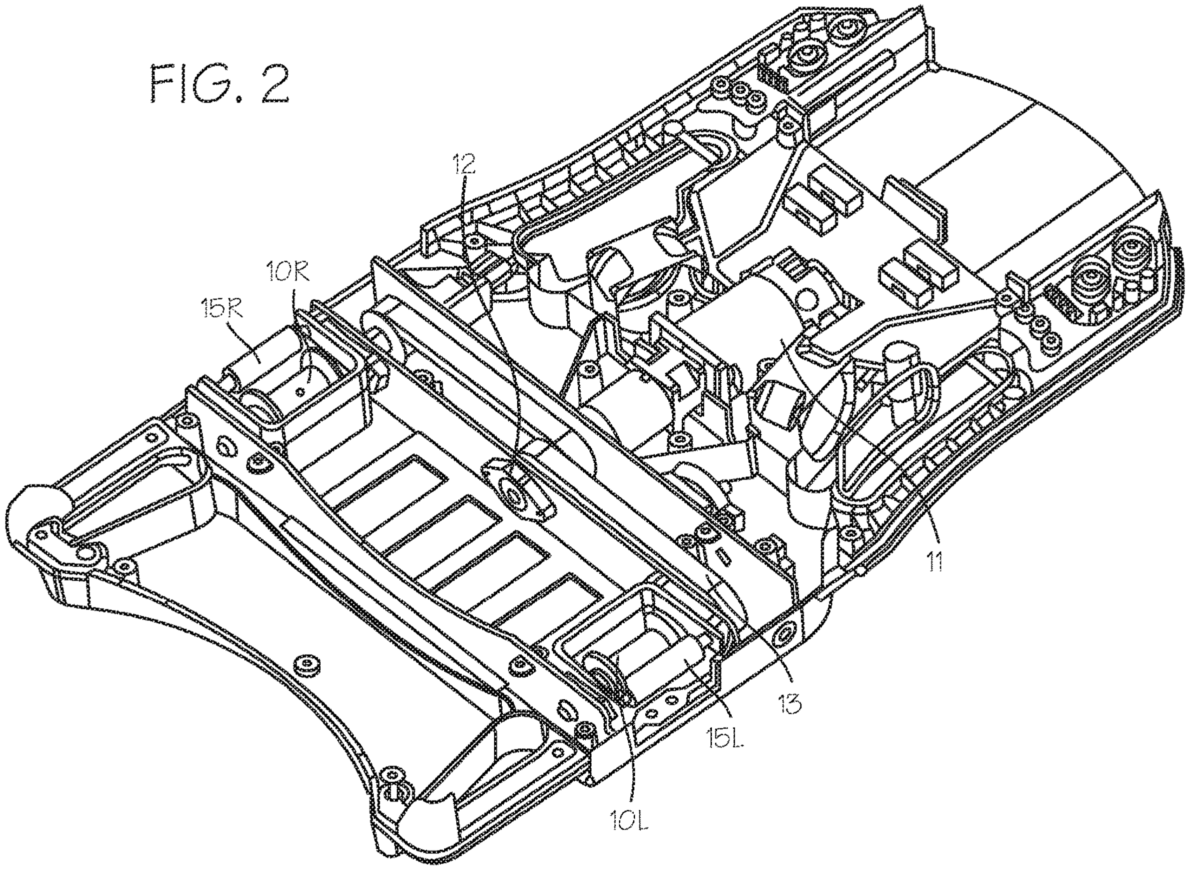
FIGS. 2 and 3 are perspective views of the CPR chest compression device.
Figure 3:
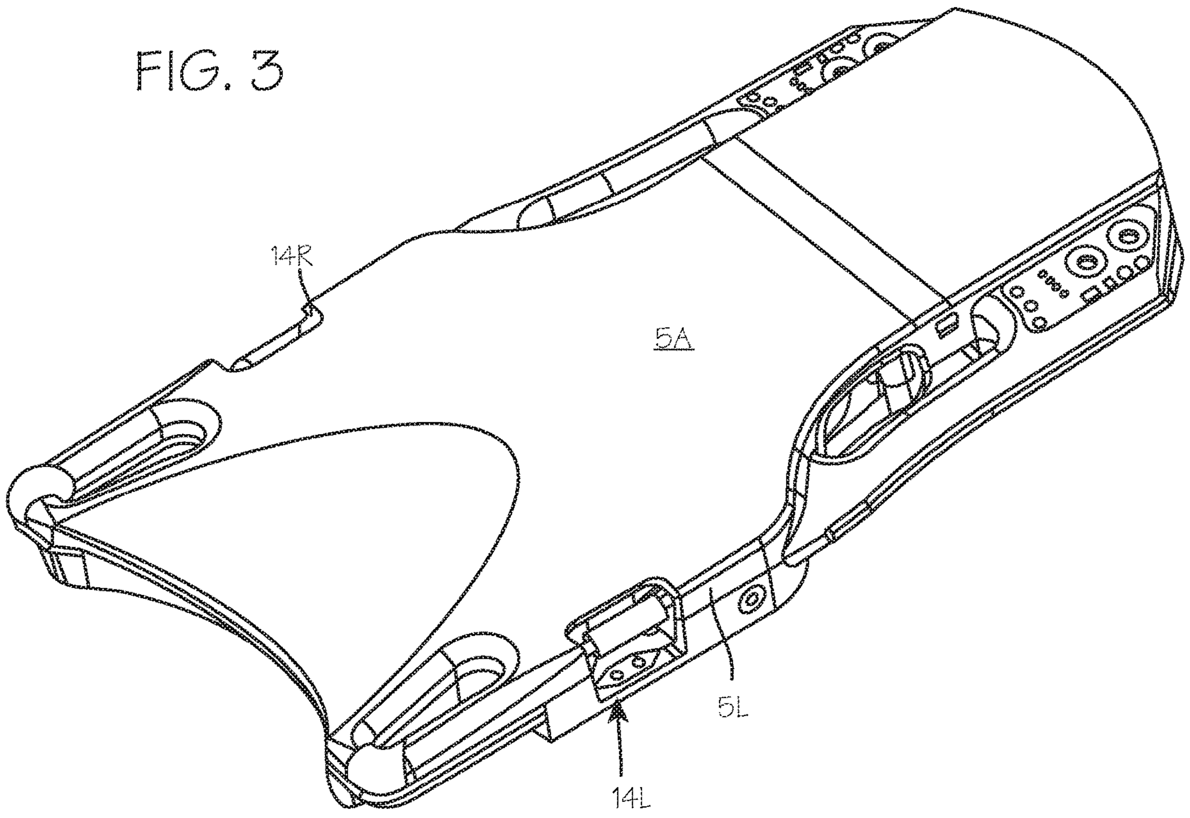

FIGS. 2 and 3 shows the CPR chest compression device in isolation. FIG. 2 provides a view of the device with the housing anterior surface hidden. As illustrated in FIG. 2, drive spools 10R and 10L are disposed laterally on either side of the housing. The belt pull straps 9R and 9L are secured to these drive spools. The lateral drive spools are in turn driven by a motor 11 also disposed within the housing, through a drive shaft 12 and drive belt 13. The belt pull straps 9R and 9L may be attached to the lateral drive spools such that, upon rotation of the drive spools, the pull straps 9R and 9L are pulled posteriorly, spooled upon the lateral spools, thereby drawing the compression belt downward to compress the chest of the patient.

FIG. 3 is a perspective view of the CPR chest compression device, illustrating the apertures in the housing which provide for access to the drive spools for connecting the belt to the drive spools. Alternatively, the chest compression device may not include apertures, and other connection or fastening components may be present on the lateral or anterior surface of the device for securing the belt to the drive spools. The apertures 14R and 14L on either side of the housing are disposed proximate the drive spools. The apertures are sized to allow passage of the belt end through the housing wall for insertion into the drive spools. The apertures can extend over the housing anterior surface 5A and lateral surface 5L as shown, or over the housing anterior surface 5A alone, or the lateral surface 5L alone, to preferably provide access to the drive spools from an anterior approach or lateral approach even while a patient is disposed on the anterior surface. Spindles 15R and 15L may be provided to guide the belt ends through the apertures.

Figure 4:
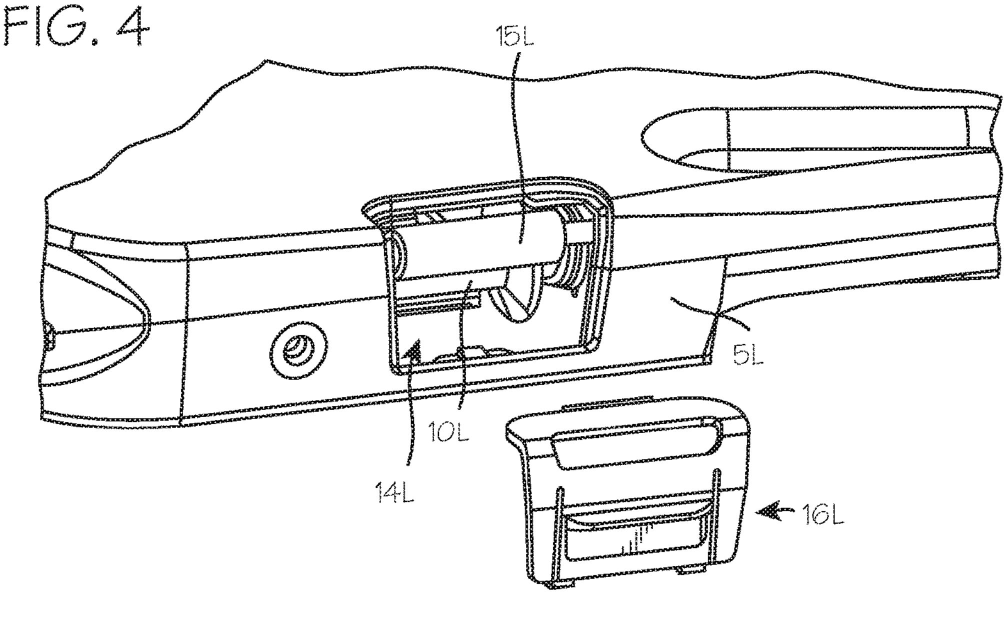
FIG. 4 is a zoomed in side view of the CPR chest compression device, illustrating the aperture in the housing which provides for access to the drive spool for connecting the compression belt to the drive spool.

FIG. 4 is a zoomed in side view of the CPR chest compression device corresponding to the view of FIG. 3, illustrating the aperture in the housing which provides for access to the drive spool for connecting the compression belt to the drive spool. In this view, the aperture 14L is shown with a guard, such as machine guard 16L, configured to fit into the aperture 14L which spans anterior surface 5A and lateral surface 5L, to cover the drive spool 10L and spindle 15L.

Figure 5:
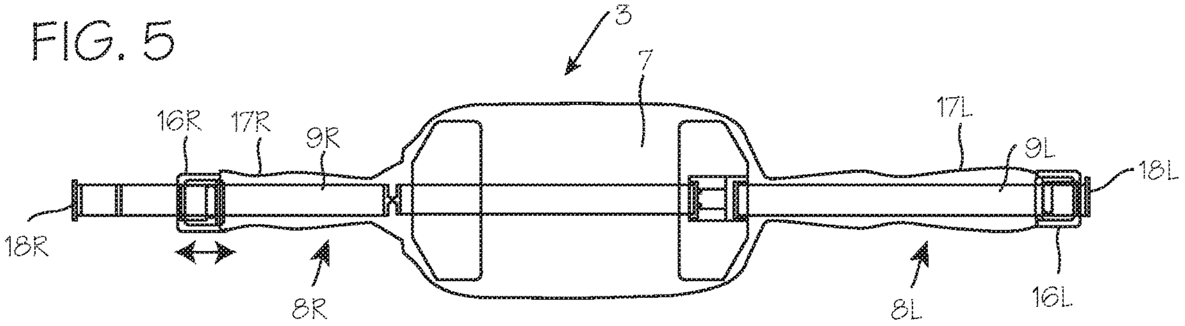
FIG. 5 illustrates a see-through top view of the compression belt assembly, including a liner sock, guards, and connection pins.

FIG. 5 illustrates one embodiment of a compression belt assembly, including the pins, with machine guards, and liner socks. The compression belt 3 includes the load distribution section 7, the left and right belt ends 8R and 8L (shown in the illustration as narrow pull straps 9R and 9L) shown in FIG. 1, along with machine guards 16R and 16L and liner socks 17R and 17L, and pins 18R and 18L. The guards are slidably disposed on their respective belt ends, so that the belt can move freely through the guard while the drive spool is tightening and loosening the belt during operation. The liner socks 17R and 17L are secured at their outer ends to their respective guards (16R and 16L), and fixed at their inner ends to the load distributing section 7, but loosely fitted over the belt ends/pull straps so that the belt end/pull straps may translate within the liner socks while the drive spool is tightening and loosening the belt during operation. The pins 18R and 18L are secured to the left and right belt ends 8R and 8L, respectively, with a long axis of the pins arranged perpendicularly to the long axis of the belt ends. The pins are slightly longer than the width of the compression belt, so that tips or ends of the pins extend beyond the long edge of the belt. These pins are configured to fit within slots in the drive spools, and also to be captured within the slots by flanges, as illustrated in FIGS. 12 to 19. The compression belt assembly may also include a buckle or fastener, disposed on a portion of the belt assembly, e.g., at a medial portion of one of the pull straps 9R and 9L and connecting the pull strap to the remainder of the compression belt assembly, operable to open the belt should it be necessary before or after the compression belt assembly is fitted around a patient and secured to the drive spools.

Figure 6:
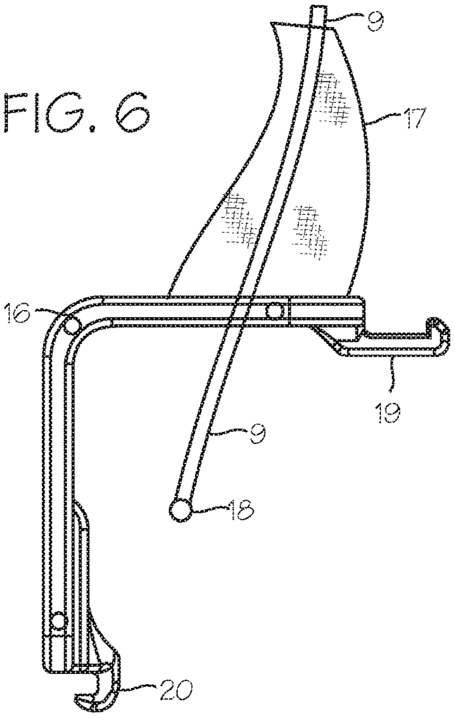
FIGS. 6 and 7 are views of the guard.
Figure 7:
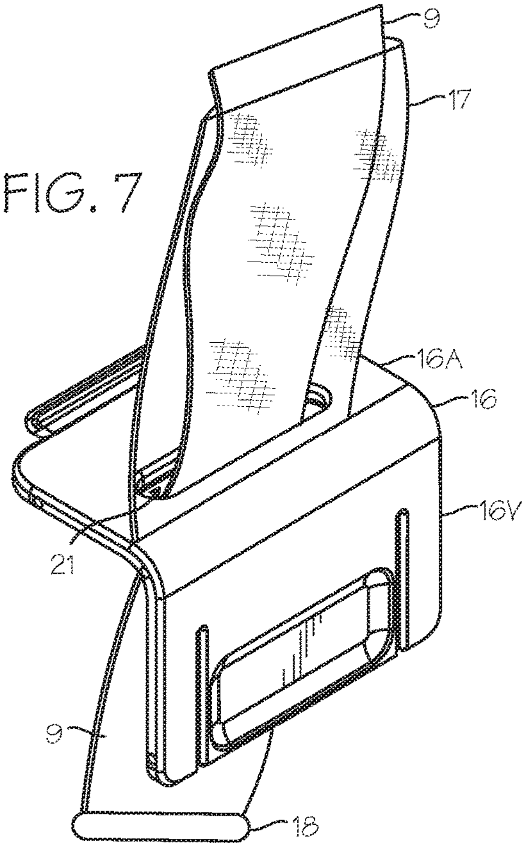

FIGS. 6 and 7 are views of one embodiment of a guard. Though the guards may take many forms, to match various apertures, receptacles, slots, or other connection or fastening components in the housing, the embodiments of FIGS. 6 and 7 are suitable for use in the housing illustrated in FIGS. 1 through 3. The machine guard 16 may be generally L-shaped, with a "vertical" lateral portion 16V configured to fit within the lateral side of the housing aperture and a "horizontal" anterior portion 16A configured to fit within the anterior portion of the housing aperture. Each portion may include a first fastener component configured to mate with a second fastener component on the housing (proximate the aperture). Fasteners may include a latch, clip, clamp or other fastening connection mechanism. For example, the upper fastener component 19 may be a latch such as snap-fit latching component such as non-releasing cantilever beam, configured to slip under a lug under the anterior housing surface (see FIG. 9). The lower fastener component 20 may be a latch, e.g. a hook, configured to engage latch component in the form of a long ridge disposed along the inside of the lateral housing surface. As seen in the perspective view of FIG. 7, the machine guard includes a slot 21, and the belt end is disposed within the slot. The belt may include a pin or other connector 18, secured to belt end. The pin and/or belt end may be disposed on the inner side of the machine guard. The machine guard may be slightly flexible, so that it may be compressed to fit into an aperture to align the snap fit component with corresponding components in the housing.

Various other configurations may be used to secure the machine guard to the housing. For example, the first fastener component may be a fixed hinge component interoperable with the hinge component proximate the aperture of the chest compression device, and the second fastener component may be a flexible fastener component, interoperable with a fixed catch component proximate the aperture of the chest compression device. The first fastener component may comprise a rigid cantilever with a lug interoperable with a first bead component proximate the aperture of the chest compression device, and the second fastener component may be a deflectable cantilever with a lug, interoperable with a second fixed bead component proximate the aperture of the chest compression device. The first fastener component may comprise a cantilever snap fit beam for securing the first portion of the machine guard over the aperture in the chest compression device disposed on the first portion, and a second fastener component disposed on the second portion, where the second fastener component is a flexible fastener component, interoperable with a fixed catch component within the housing proximate the aperture of the chest compression device. The machine guard may also be secured to the housing with rotating latches, snaps, toggle bolts, or any other means for releasably fastening the machine guard to the housing.

Figure 8:
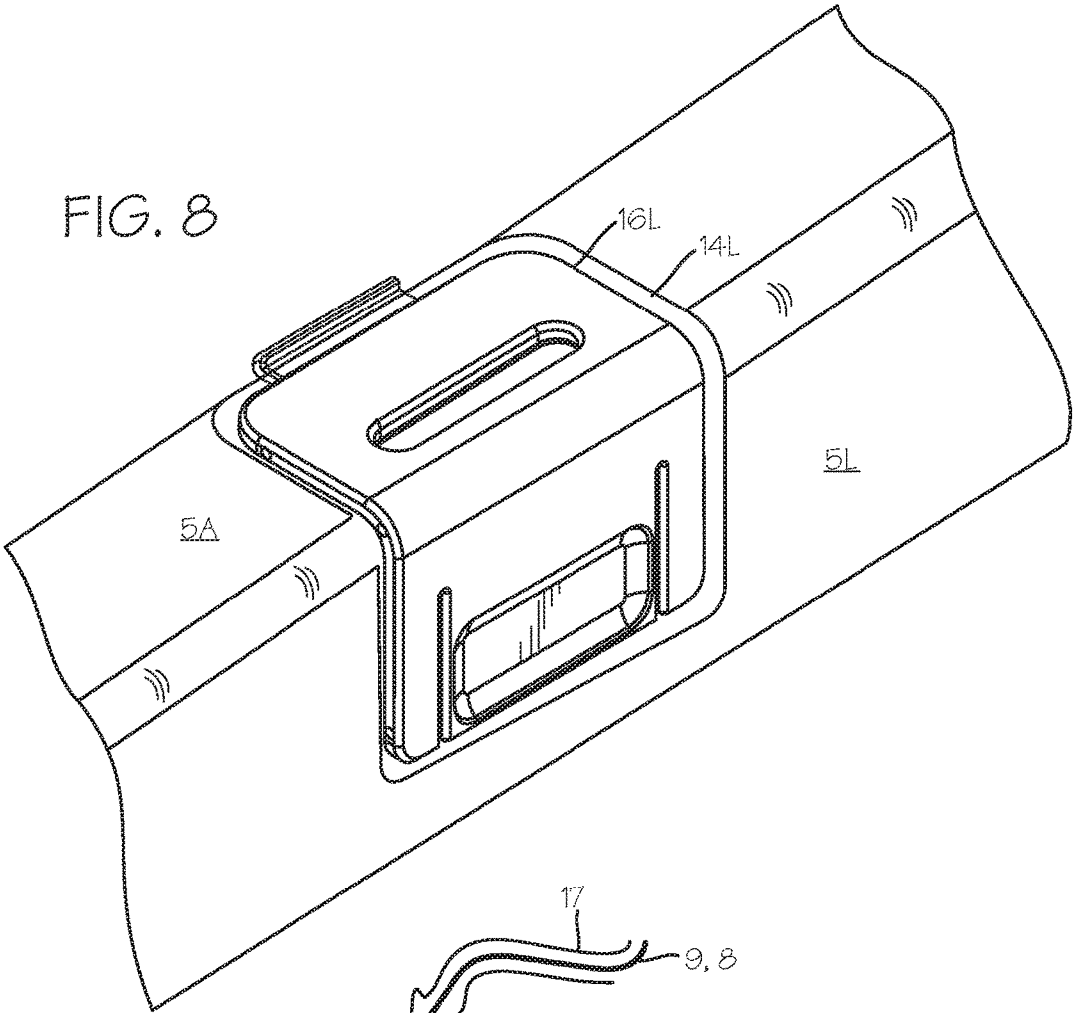
FIGS. 8 and 9 illustrate the connection of the guard and the housing.
Figure 9:
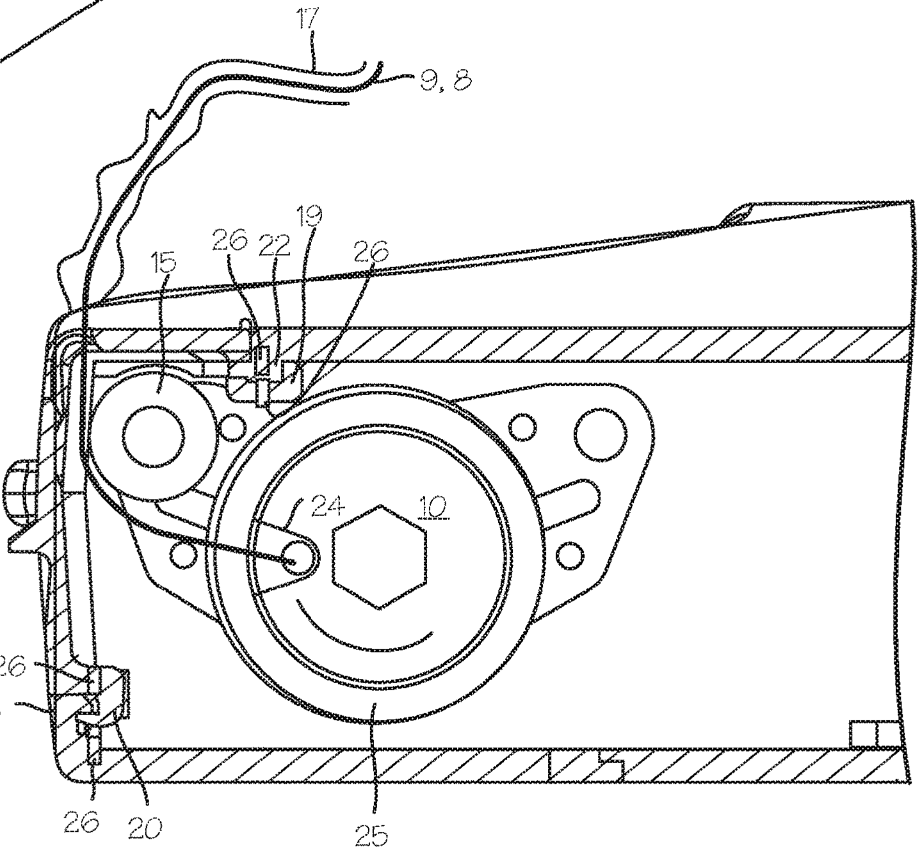

FIGS. 8 and 9 illustrate the connection of the machine guard and the housing, according to one embodiment. As shown in FIG. 8, the machine guard may fit into the aperture over the drive spool and spindle. The belt end passes through the slot in the machine guard. The liner sock is secured to the anterior surface of the machine guard, and fits loosely around the belt end. As shown in the cross section of FIG. 9, the machine guard fastening components 19 and 20 mate with corresponding fastening components 22 and 23 on the inside of the housing. Also as shown in FIG. 9, the belt end 8 is secured within a slot 24 in the drive spool 10, and may be secured in place with a flange 25 which is disposed over the drive spool, near the outer edge of the belt end (trapping the tips of the pins that extend outside of the edge of the belt). The spindle 15 is also more clearly shown in FIG. 9.

FIG. 9 also shows sensors operable to detect the presence and proper installation of the guard. One or more sensors, e.g., first or second sensor components or proximity or contact sensor component pairs 26 may be fixed or otherwise coupled to or associated with the machine guard and/or housing, operable to detect proximity or contact of the machine guard-mounted sensor component with the housing mounted sensor component, and generate a signal for transmission to the control system. The control system may be operable to detect the signal corresponding to proximity or contact of the machine guard, indicating proper attachment or securement of the machine guard to the housing, and control operation of the device accordingly. For example, the control system may prevent tightening or loosening operation of the belt unless a signal corresponding to proper proximity or contact is received from the sensor. Operation of the belt is prevented unless a signal indicating proper attachment or securement of the machine guard to the housing is received by the control system. Ensuring attachment or securement of the machine guard before permitting operation of the belt provides safety for the user, e.g., by protecting a user's fingers or other body parts or clothing from coming into contact with the rotating drive spool and belt during device operation, thereby preventing potential injury to a user or damage to the device. The control system may also operate an annunciator or display to alert the user that the machine guards are or are not properly installed, e.g., providing an alarm or other alert or indicator, or a message on a user interface or display.

A variety of sensors or attachment sensors may be used, e.g., contact sensors or proximity sensors, including contact relays, contact switches, magnetic sensors, capacitive sensors inductive sensors, optical sensors, photocells, ultrasonic sensor, or any other means for sensing contact or proximity of the machine guard to the housing. Sensors may include a first sensor component and second sensor component, e.g., a sensor target and a sensing component operable to sense the presence or location of the sensor target, and either sensor component may be disposed on the guard or on the housing. A relay switch may comprise an electromagnetic switch operated by a small electric current, with a magnet or electromagnet on one structure (the housing or the guard) and a spring-loaded switch on the other structure, where proximity of the magnet or electromagnet functions to close or open the spring-loaded switch. A change in the switch position may be taken by the control system as a signal indicative of proper placement of the guard. A contact switch may comprise a switch on one structure (the housing or the guard) activated by contact with an impinging component on the other structure. For example, a reed switch disposed on the housing, operable to be closed by a protrusion on the guard, or the guard itself, when the guard is inserted properly into the aperture. Closure of the switch may be taken by the control system as a signal indicative of proper placement of the guard. A magnetic sensor may comprise a Hall effect sensor on one structure (the housing or the guard), and a magnet on the other structure. Detection of the magnetic field of the magnet may be taken by the control system as a signal indicative of proper placement of the guard. A capacitive sensor may comprise a capacitive sensor probe with a sensing electrode on one structure (the housing or the guard), and a conductive target, or a capacitive sensor probe on one structure, combined with a conductive target on the same structure on the opposite side of a channel which accommodates the other structure, operable to sense the entry of the other structure (whether conductive or non-conductive) by its effect on the capacitance measured by the capacitive sensor probe. Detection of the target may be taken by the control system as a signal indicative of proper placement of the guard. An inductive sensor may comprise a magnetic field oscillator on one structure (the housing or the guard), and a conductive target on the other structure. Detection of a change in the amplitude of the oscillator may be taken by the control system as a signal indicative of proper placement of the guard. An optical sensor may comprise photoelectric detectors and optical encoders. Optical encoders, for example, may comprise an encoder scanner on one structure (the housing or the guard), and an encoder scale on the other structure. Detection of the encoder scale by the encoder scanner may be taken by the control system as a signal indicative of proper placement of the guard. A photoelectric sensor may comprise an emitter light source on one structure (the housing or the guard), and a photodetector the other structure (or a reflector on the other structure and a photodetector on the first structure). Detection of light, or loss of detection of light, from the emitter light source by the photodetector may be taken by the control system as a signal indicative of proper placement of the guard. An ultrasonic sensor may comprise a transducer on one structure (the housing or the guard), and a reflective target on the other structure (the structure itself may constitute the target), in a through-beam or reflective arrangement. Detection of ultrasound from reflected by the target, or alteration of the ultrasound by transmission through the target may be taken by the control system as a signal indicative of proper placement of the guard.

In one example, one or more magnets may be positioned on the guard, e.g., on a machine guard fastening component 19, 20 or elsewhere on the machine guard. The magnet may be detected by a magnetic sensor positioned on or in the device housing, e.g., in a location on or near where the machine guard couples to the housing. Alternatively, a magnet may be positioned on the device housing and the magnetic sensor on the guard. In another example, a portion of the machine guard, e.g., the machine guard fastening component or first sensor component, 19 or 20, as shown in FIG. 6, may actuate a contact switch or second sensor component, which transmits a signal corresponding to proper attachment or securement of the machine guard to the housing, to the control system. Various contact switch arrangements may be utilized. For example, the machine guard fastening component or protrusion may actuate a rod or pin located within the housing, which rod or pin comes into contact with a contact switch, (e.g., directly or indirectly e.g., via a lever), resulting in the transmission of a signal to the control system. Alternatively, a contact switch may be positioned on the guard and a protrusion or other actuator may be positioned on the housing. In response to receiving any of the generated signals described herein, the control system may control operation of the chest compression device, e.g., by preventing or allowing motor operation to perform repeated chest compression cycles.

Figure 10:
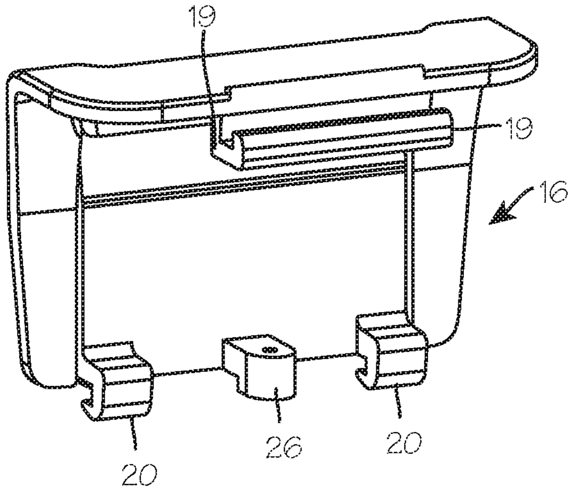
FIG. 10 illustrates a second embodiment of the guard.

FIG. 10 illustrates a second embodiment of a machine guard 16. The machine guard includes upper and lower fastener components 19 and 20. The lower fastener component 20 may include two more latches or ridges, separated by a slot or receptacle for holding a first sensor component 26. Optionally, the first sensor component may be positioned in a different location on the machine guard, to provide for optimal communication with a second sensor component located on the chest compression device or device housing.

Figure 11:
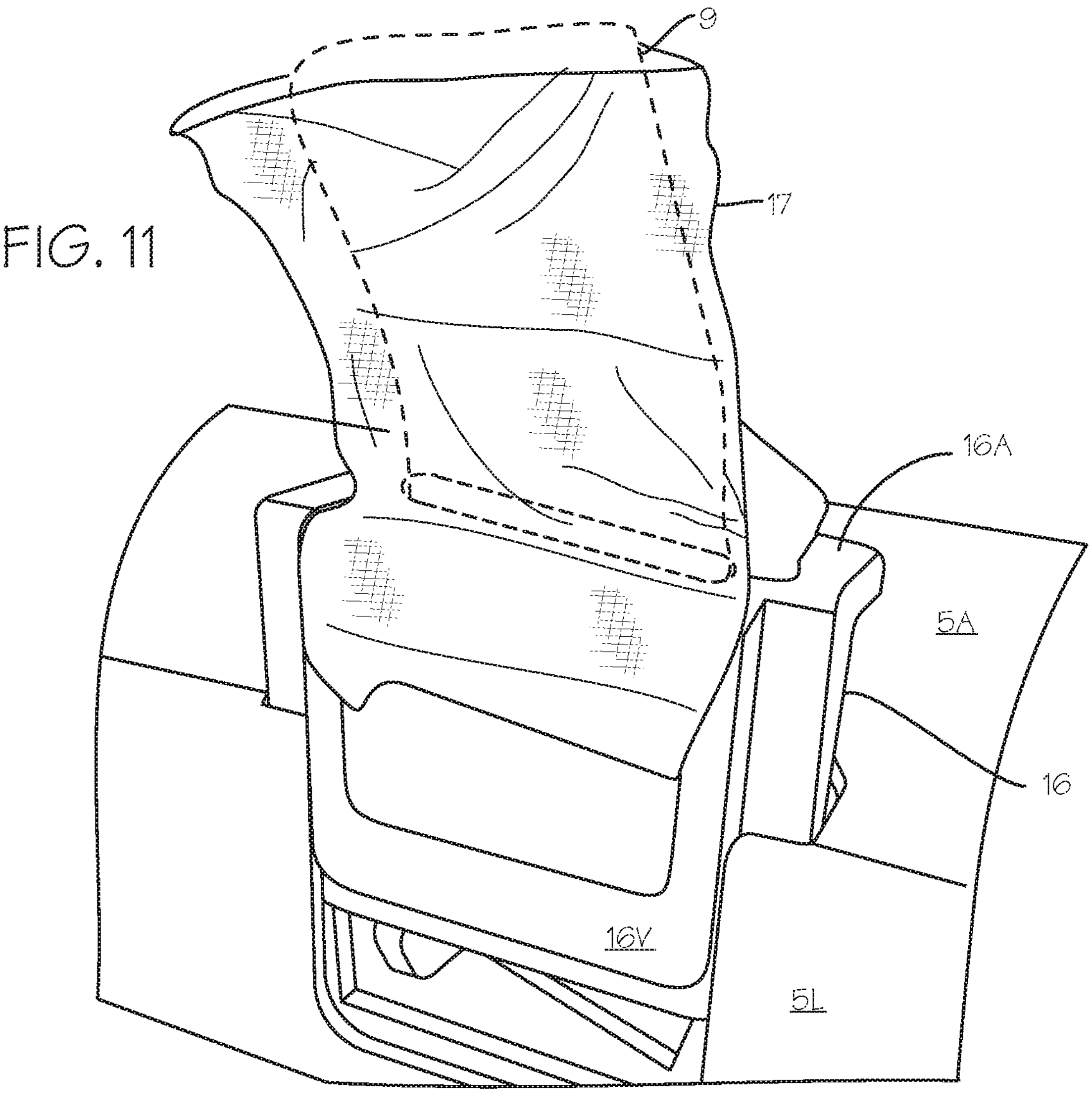
FIG. 11 illustrates a third embodiment of the guard.
Figure 12:
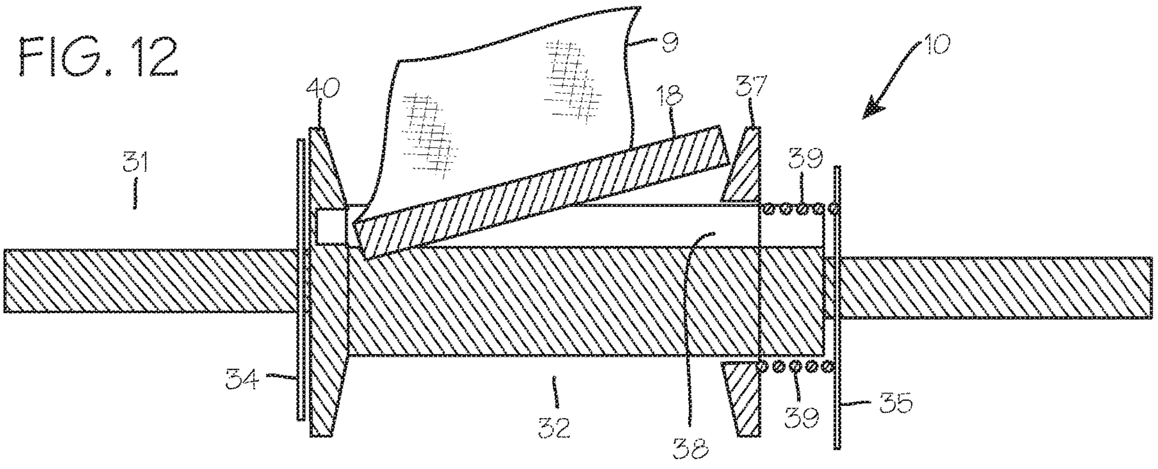
FIGS. 12 through 15 illustrate a drive spool and pin arrangement configured for releasable attachment of the belt to the drive spool.

FIG. 11 illustrates a third embodiment of the machine guard. In this embodiment, the machine guard 16 is also generally L-shaped, with a "vertical" lateral portion 16L configured to fit within the lateral side of the housing aperture and a "horizontal" anterior portion 16A configured to fit within the anterior portion of the housing aperture. The belt end passes through an aperture in the "horizontal" anterior portion 16A of the machine guard. A tongue running around the edge of the "vertical" lateral portion 16V fits into a corresponding groove in the lateral wall 5L. The "horizontal" anterior portion 16A may include a fastening component configured to engage a corresponding fastening component fixed to the anterior surface of the housing. One or more sensors, as described above, may be located on the machine guard.

In another embodiment, a chest compression device having a platform housing a motor and a drive spool operable to tighten a compression belt about the thorax of a patient is provided. The compression belt includes a first end and a second end. The first end is releasably attachable to the drive spool. A guard is fixed or otherwise coupled to the platform. The guard may be positioned in a secured position, which conceals the drive spool from the user, protecting the user or other objects from contacting the drive spool during operation, or an unsecured position, which exposes the drive spool. A first sensor component is disposed on the guard and is interoperable with a second sensor component disposed on the platform housing. The first sensor component is detectable by the second sensor component or vice versa, for detection of the attachment of the guard to the chest compression device. Detection of the first or second sensor component indicates whether the guard is in the secured position, and a control system of the chest compression device can control operation of the compression belt in response to the guard being in a secured or unsecured position. By preventing operation of the chest compression device unless the guard is in a secured position where it provides a barrier between the user and the drive spool, potential injury to the user or damage to the device is prevented. As described herein, a guard may be coupled or connected to a compression belt assembly (and releasably attached to a compression device platform, to cover a drive spool or operating mechanism), or alternatively, the guard may be fixed or coupled to the platform of the chest compression device, and after attaching the belt to the drive spool, rotated or slid into a secured position, to cover the drive spool or other operating mechanism. Any of the sensors or sensor components described herein may be utilized in the above embodiments.

Figure 13:
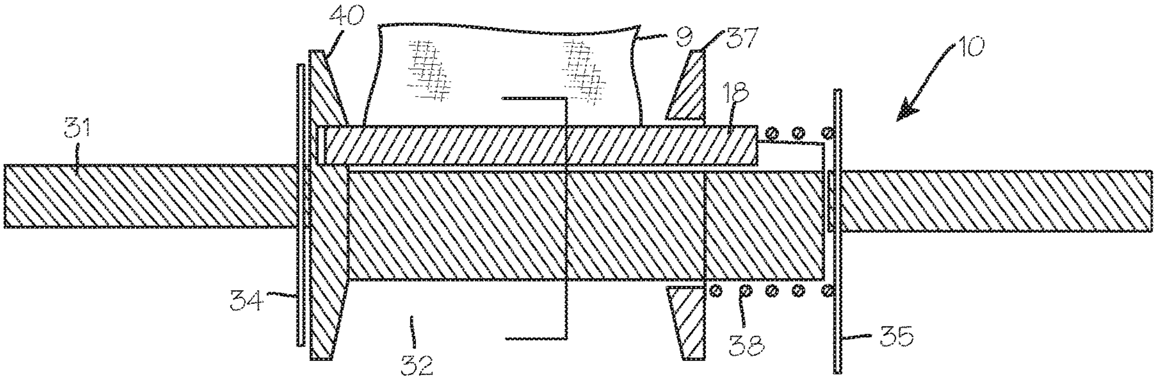
Figure 14:
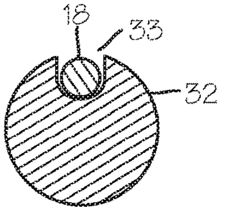
Figure 15:
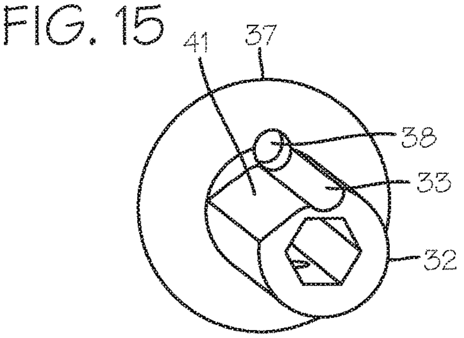

FIGS. 12 through 15 illustrate a drive spool and pin arrangement configured for releasable attachment of the belt to the drive spool. The drive spool 10 comprises a spool shaft component 31 which is operably connected to the motor drive shaft 12 through the drive belt 13 (both shown in FIG. 2), and also comprises a spool portion 32 (which may be integral with the shaft, or disposed about the shaft) with a channel 33 for receiving the pin 18. The channel runs the length of the spool portion, and is long enough to receive the pin. The spool shaft component and spool portion are supported within the housing by a support walls 34 and 35. Two flanges are provided to trap the pin ends 36. A first flange 37 is slidably disposed over the spool portion, and includes an aperture 38 for receiving the pin, so that it may be translated longitudinally along the spool portion to uncover the channel sufficiently to allow insertion of the pin into the channel, and then translated longitudinally along the spool portion to trap the end of the pin within the channel. This first flange 37 may be disposed at either end of the spool shaft, and is preferably biased toward the opposite end of the spool portion, with a spring 39 disposed between the flange and the support wall 35, but can be secured in the trapping position with detents, latches or other means for holding the flange in the trapping position. The second flange 40 on the opposite end of the spool portion may be fixed longitudinally on the spool portion, or may be longitudinally translatable and biased as with the first flange. FIG. 13 illustrates the drive spool and pin arrangement with the first flange in the trapping position, and held there by the spring. FIG. 14 is a cross section of the spool portion, showing the pin 18 disposed with the channel 33 of the spool portion 32. The depth of the channel may be varied between the right and left side drive spools, where the drive spools are otherwise symmetrically disposed on the left and right side of the device, to account for differences in belt travel arising from different directions spooling. FIG. 15 is a perspective view of a segment of the spool portion 32 illustrating two variations in the configuration. In the embodiment shown in FIG. 15, the spool portion 32 includes a wrench flat 41 (a flat surface milled into the otherwise round outer contour of the spool) along the length of the spool, on the trailing side of the channel. Also, the channel is a half-pipe or partial-pipe configuration, and the flanges include circular apertures 38 extending beyond the outer diameter of the spool portion, to receive the tips of the pins.

Figure 16:
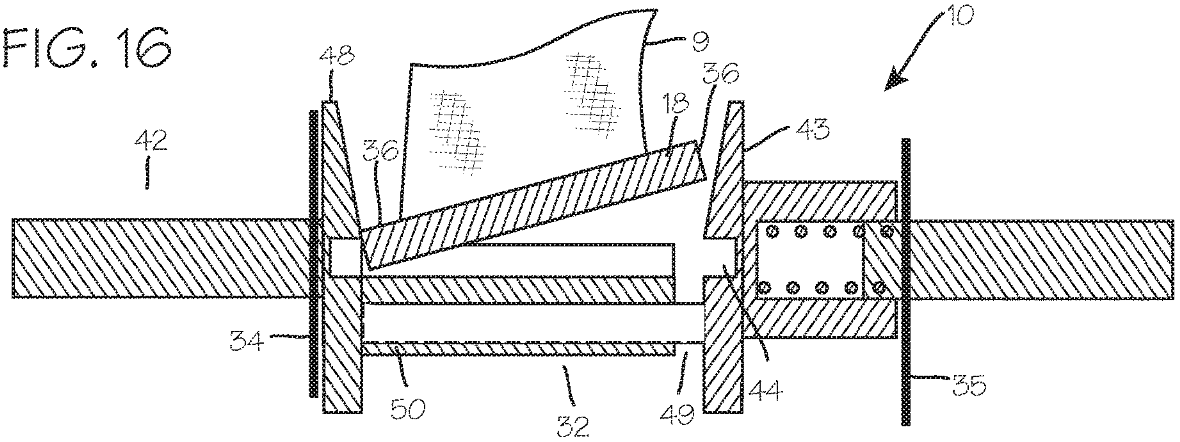
FIGS. 16 through 19 illustrate a drive spool and pin arrangement configured for releasable attachment of the belt to the drive spool.
Figure 17:
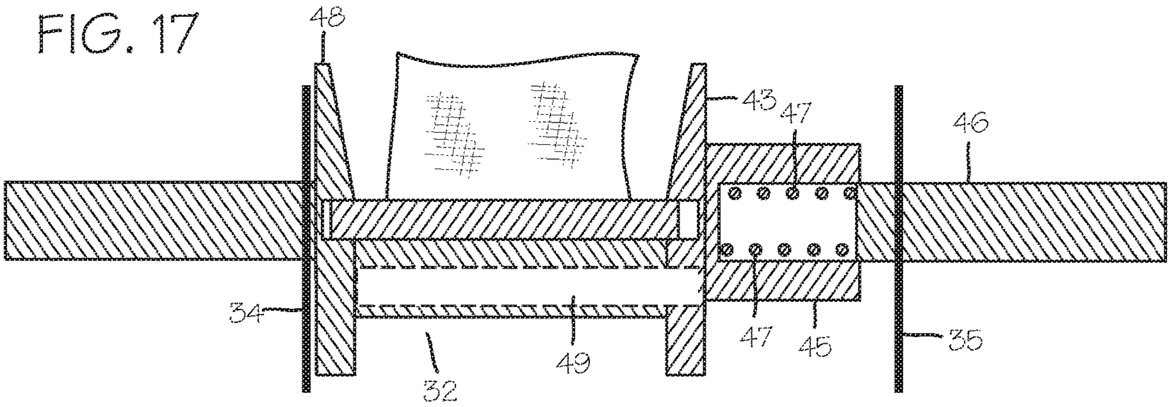
Figure 18:
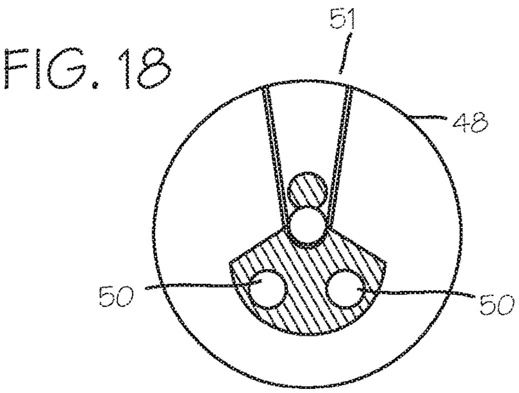
Figure 19:
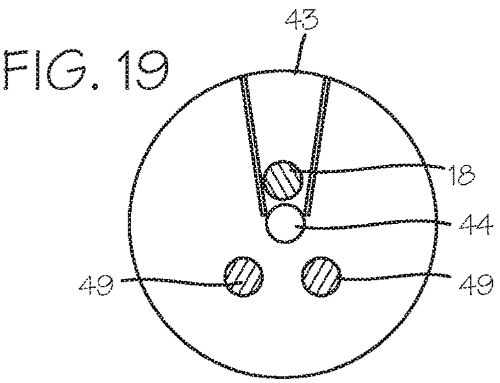

FIGS. 16 through 19 illustrate a drive spool and pin arrangement configured for releasable attachment of the belt to the drive spool. As in the previous figures, the drive spool 10 comprises a spool shaft component 42 which is operably connected to the motor drive shaft 12 through the drive belt 13 (both shown in FIG. 2), and also comprises a spool portion 32 (which may be integral with the shaft, or disposed about the shaft) with a channel 33 for receiving the pin 18. The channel runs the length of the spool portion, and is long enough to receive the pin. The spool shaft component and spool portion are supported within the housing by support walls 34 and 35. Two flanges are provided to trap the pin ends 36. A first flange 43 is slidably disposed relative to the spool portion, so that it may be translated longitudinally relative to the spool portion to allow insertion of the pin into the channel, and then translated longitudinally along the spool portion to trap the end of the pin within the channel and the aperture 44 of the flange. This first flange 43 is disposed at the end opposite the spool shaft, and is supported on a journal bearing 45 (which is also longitudinally translatable relative to the spool portion), which in turn is supported by the journal shaft 46 supported by the support wall 35. The flange and journal bearing are biased toward the opposite end of the spool portion, with a spring 47 disposed between the flange and the support wall 35 (within or about the journal bearing), but can be secured in the trapping position with detents, latches or other means for holding the flange in the trapping position. A second flange 48 on the opposite end of the spool portion may be fixed longitudinally on the spool portion, or may be longitudinally translatable and biased as with the first flange. One or more guide rails 49 are fixed to the first flange, and extend into corresponding guide channels 50 within the spool portion, and are slidable within the guide channels. The rails and guide channels may be disposed off-center in the spool portion, or they may have non-circular cross sections, to aid in torque transfer. The pin and flange pockets may be centered in the spool portion (and the flanges) or may be disposed off-center. FIG. 16 shows this embodiment with the first flange in a retracted position, which allows insertion of the pin into the channel, while FIG. 17 shows the embodiment with the first flange in the trapping position, biased toward the opposite end of the spool portion by the spring. FIG. 18 is a cross section of the spool portion of FIG. 16, showing the location of the guide channels and pin channel, and a sloped slot 51 which may be incorporated into the flange 48 which helps guide the pin into the channel. FIG. 19 is a cross section of the guide rail components, showing the location of the guide rails 49 which extend from the first flange 43, and a sloped slot 52 which may be incorporated into the first flange 43 which helps guide the pin into the channel and/or the aperture.

In use, a CPR provider will assemble the CPR chest compression device about a patient, placing the device under the patient's thorax, placing the compression belt around the patient's thorax, and inserting the pins into the drive spools, and inserting the machine guard into the apertures. The belt may be secured to the drive spools, and thereafter closed over the patient's thorax using a buckle or fastener disposed along the belt. Alternatively, the belt may be placed about the patient's thorax and thereafter secured to the drive spools. The CPR provider will then provide input to the control system of the CPR chest compression device to cause the device to perform repeated chest compression cycles.

To attach compression belt assembly to a chest compression device, the CPR provider will insert one of the pins secured to an end of the compression belt assembly through an aperture in a housing of the compression device into a receiving channel in a drive spool, forcing the sliding flange as necessary to expose the receiving channel so as to fit the pin in the channel, and then slide a machine guard (which is slidably disposed on the compression belt assembly) along the compression belt; and releasably attach the machine guard to the housing to occlude the aperture. In a symmetrical system, the CPR provider will attach both belt ends in similar fashion. Once the system is assembled about the patient, the CPR provider will operate the control system to initiate compressions. If the machine guard sensors or sensor components are used, operator initiation of compressions will cause the control system to receive analysis signals from the sensors to determine whether the machine guard is attached to the housing, and control operation of the compression belt in response to the absence or presence of the machine guard.

Referring again to FIG. 3, the system may be enhanced with various features. For example, the housing may be trimmed with a gasket joining upper and lower portions of the housing to prevent fluid entry and seal the device, and the housing may be trimmed along lateral surfaces and corners with resilient bumpers. The bumpers may comprise leaf sprigs over-molded with rubber, to protect the system from mechanical shock. The surface of the device, especially the anterior surface, which supports the patient and is in contact with the patient during use, may comprise a low durometer polymer such as rubber or silicone to aid in positioning the patient while installing the system, and/or to help grip or hold the patient in position on the device. The upper surface can be configured with a depression, to aid in positioning the patient so that the load distributing portion of the belt is located over the sternum of the patient.

Figure 20:
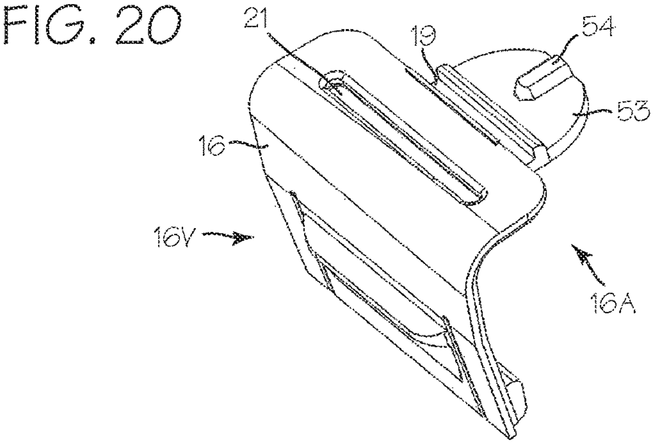
FIGS. 20 through 22 are views of a guard and sensor housing structure.
Figure 21:
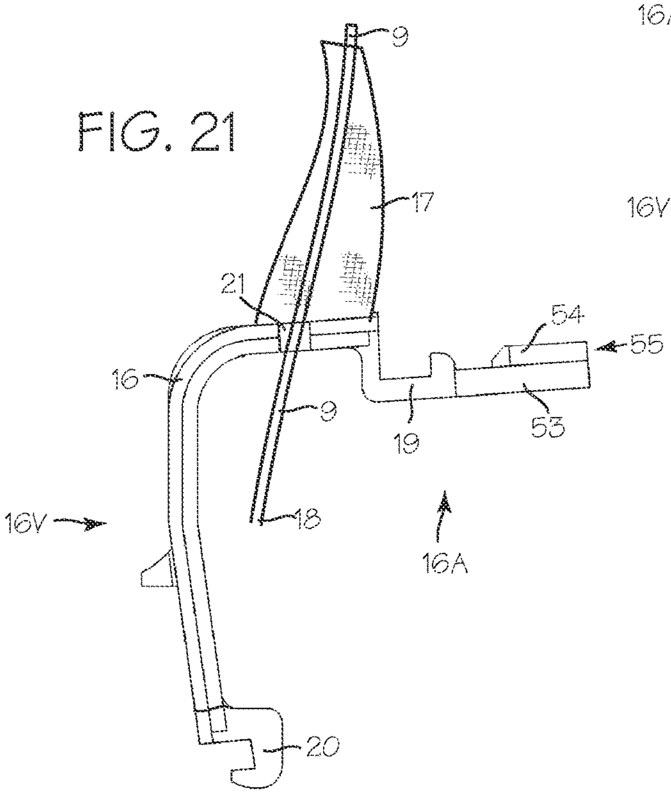
Figure 22:
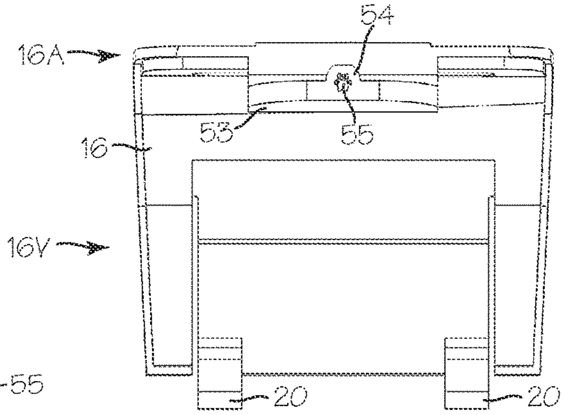

FIGS. 20 through 22 are views of an additional embodiment of the machine guards. These machine guards are suitable for use in the housing illustrated in FIGS. 1 through 3. The machine guard 16 of FIGS. 20 through 22 include the generally L-shaped, "vertical" lateral (or second) portion 16V configured to fit within the lateral side of the housing aperture and a "horizontal" anterior (or first) portion 16A configured to fit within the anterior portion of the housing aperture. Other shapes are also contemplated. The machine guard 16 also includes an upper fastener component 19 illustrated as a latch such as a snap-fit latching component e.g., a non-releasing cantilever beam, configured to slip under a lug under the anterior housing surface (see FIG. 9), a lower fastener component 20 configured to engage a latch component e.g., in the form of a long ridge, disposed along the inside of the lateral housing surface, and a slot 21 for receiving the belt end 19. As with the previous figures, the belt may include a pin or other connector 18, secured to the belt end disposed on the inner side of the machine guard. In addition to the features of FIGS. 6 and 7, the machine guard of FIGS. 20 through 22 includes a extension 53, extending from the edge of the fastener component 19, with a sensor housing 54 disposed on a surface of the extension 53. The chest compression device housing 4 and apertures 14 are configured to accept the extension 53. As shown in the medial view of FIG. 22, a first sensor component 55 is disposed within a channel in the sensor housing 54 (shown in FIG. 21), and a second sensor component is disposed within the housing, proximate the aperture (and proximate the first sensor component 55 when the machine guard is installed in the aperture). Preferably, the first sensor component 55 (mounted on the machine guard) comprises a magnet, and the second sensor component comprises a magnetic sensor, though any of the various sensor components recited above may be used. The extension may also help ensure proper guard orientation/insertion by a user. The extension may support a larger or longer first sensor component than a guard without such extension, thereby optimizing the proximity or sensitivity of the first sensor component to the second sensor component. The first sensor component may be centered on the extension, thereby optimizing the proximity or sensitivity of the first sensor component to the second sensor component whether the machine guard is inserted into the left or right aperture 14.

Figure 23:
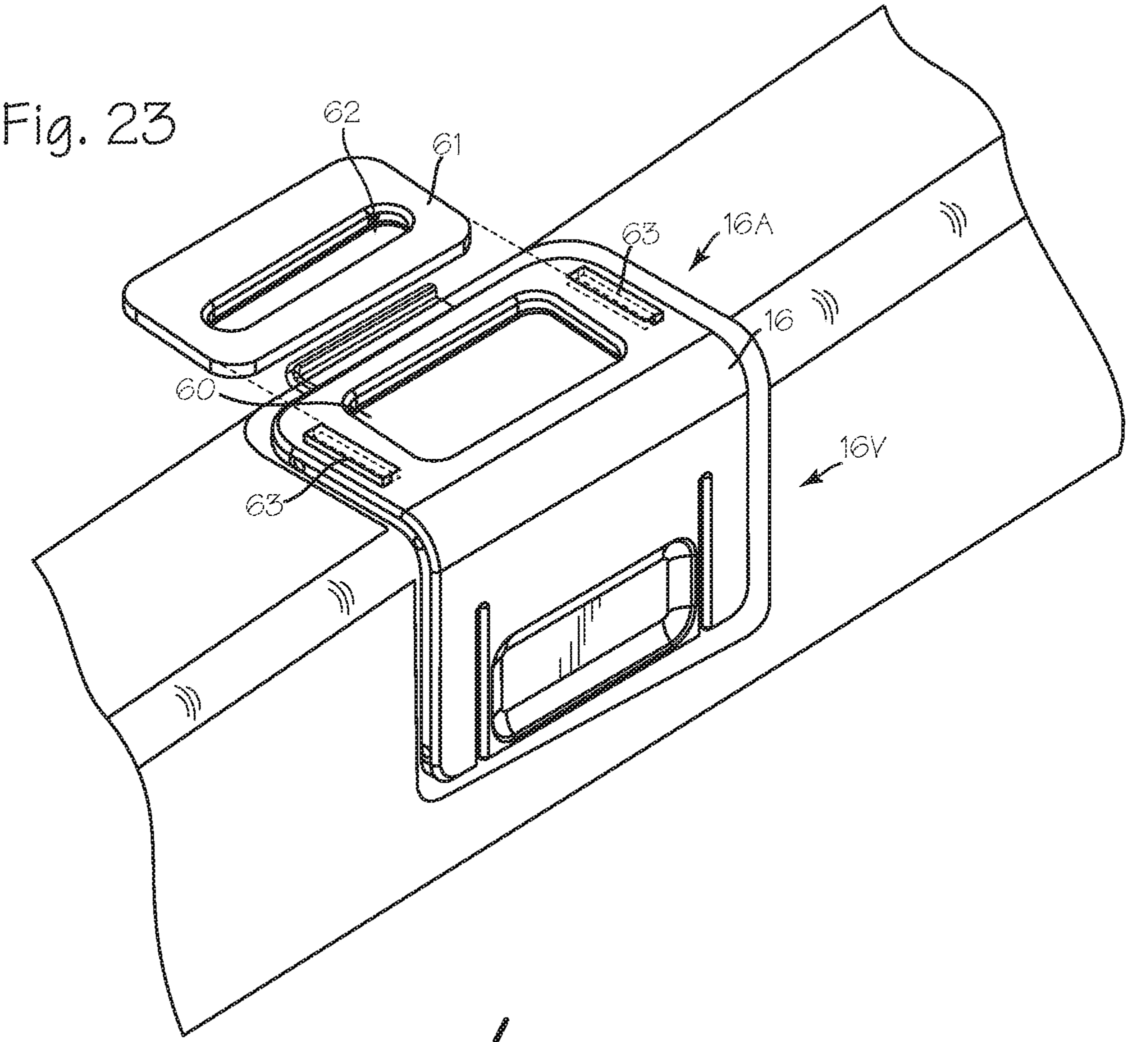
FIGS. 23 and 24 illustrate a machine guard with a slot disposed in a plate which may be translated medially and laterally to position the belt for patients of different size.
Figure 24:
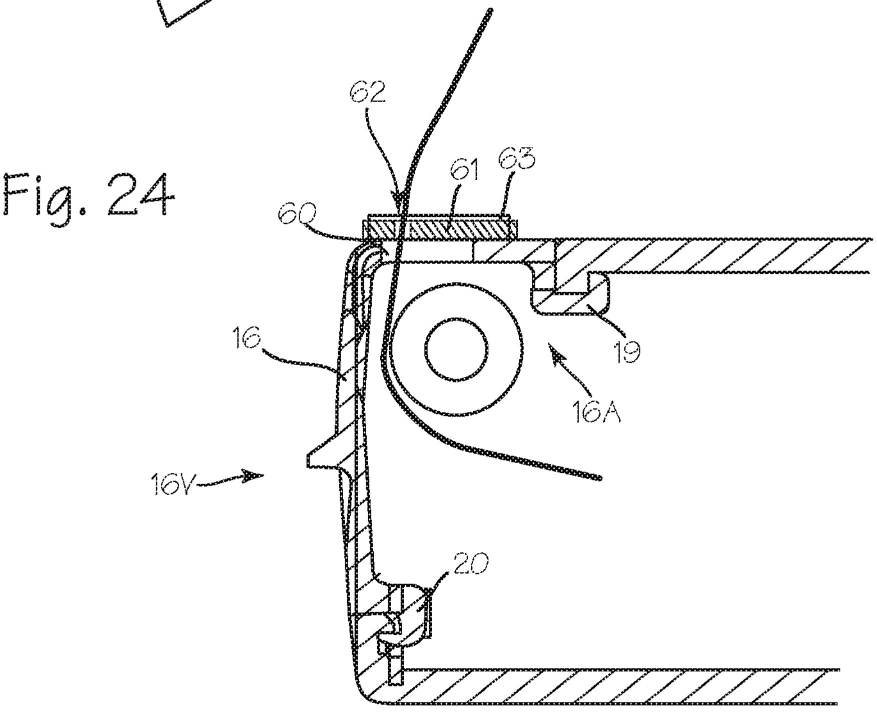

FIGS. 23 and 24 illustrate a machine guard with a moveable slot disposed in a plate which may be translated medially and/or laterally relative to a patient on a chest compression device to position the belt for patients of different size, to minimize friction between the belt and the inner surfaces of the slot. The machine guards of FIGS. 22 and 23 are suitable for use with the housing illustrated in FIGS. 1 through 3 and with the compression belt assemblies described herein. The machine guard 16 of FIGS. 23 and 24 includes the generally L-shaped, "vertical" lateral (or second) portion 16V configured to fit within the lateral side of the housing aperture and a "horizontal" anterior (or first) portion 16A configured to fit within the anterior portion of the housing aperture. Other shapes are also contemplated. The machine guard 16 may include an upper fastener component 19 illustrated as a latch such as a snap-fit latching component, e.g., a non-releasing cantilever beam, configured to slip under a lug under the anterior housing surface (see FIG. 9), a lower fastener component 20 configured to engage a latch component, e.g., in the form of a long ridge, disposed along the inside of the lateral housing surface, and a slot 21 for receiving the belt end 19. As with the previous figures, the belt may include a pin or other connector 18, secured to the belt end disposed on the inner side of the machine guard.

Figure 25:
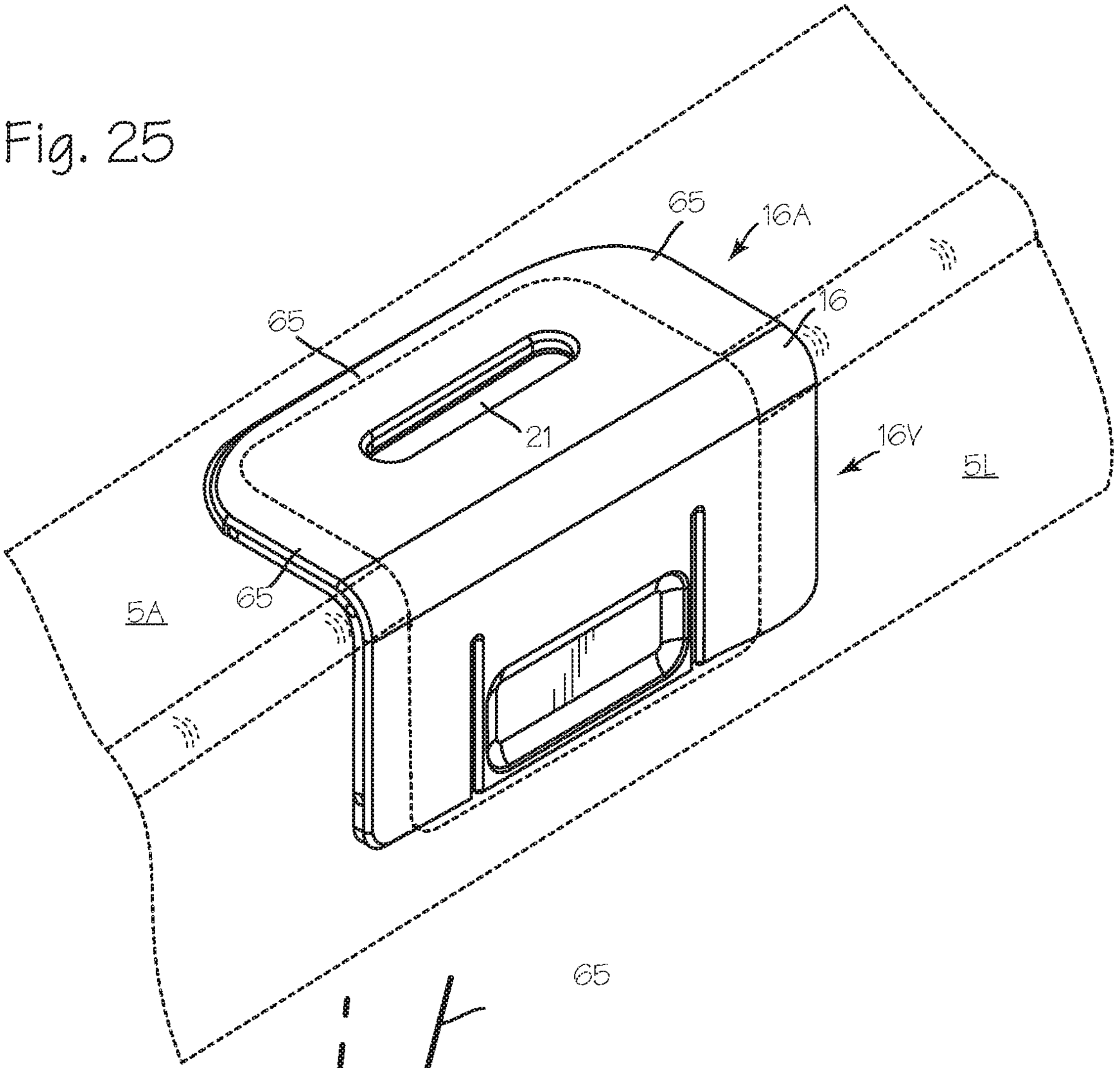
FIGS. 25 and 26 illustrate a machine guard configured to rotate about a lower hinge point, to adjust the belt slot medially and laterally, to position the belt for patients of different size.
Figure 26:
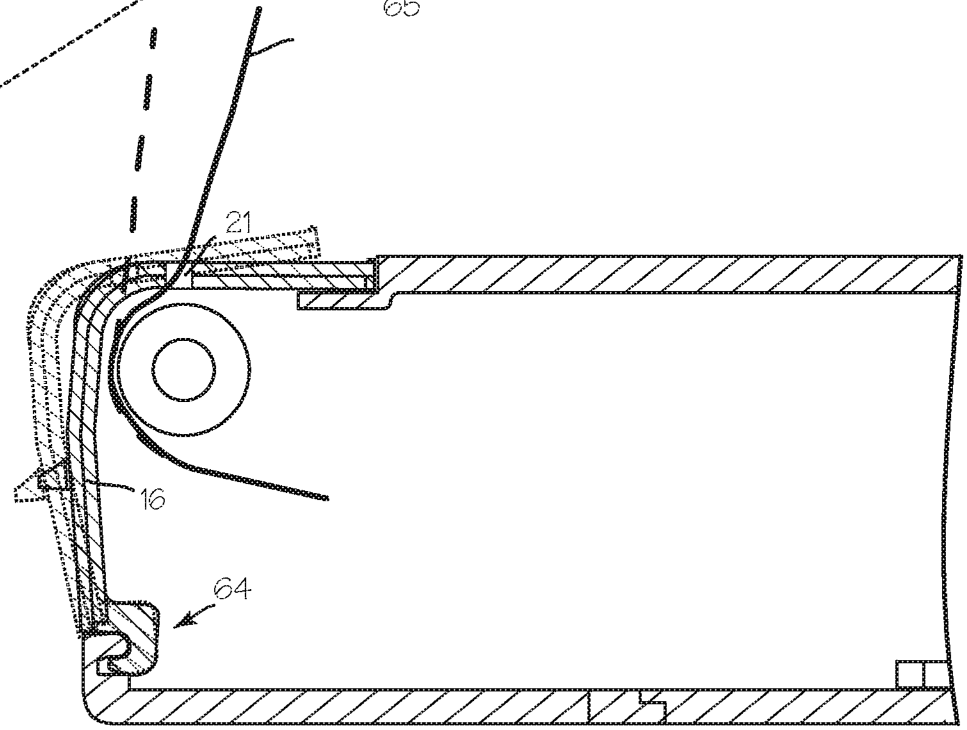

The machine guard of FIGS. 23 and 24 may include a large aperture 60 in the anterior portion 16A and a plate 61 slidably disposed over the anterior portion 16A, such that the plate may translate or float medially and/or laterally over the anterior portion during prior to and/or during operation of a chest compression device. A slot 62, which is narrower than aperture 60, oriented superiorly/inferiorly (e.g., perpendicular to the medial/lateral translation of the plate), is provided in the plate, through which the belt may slide during operation (similar in function to the slot 21 shown in FIGS. 6, 7 and 8). The plate may be slidably secured to the anterior portion 16A of the machine guard in any suitable manner, such as with rails 63 on each side of the anterior portion 16A. The aperture 60 accommodates the belt, and the inferior/superior dimension of the aperture may be at least as large as the width of the belt. The lateral/medial dimension of the aperture 60 is large enough to accommodate various desired lateral/medial positions of the belt and/or slot 62. The plate 61 with slot 62 may be translated over the anterior portion 16A and the aperture 60 prior to or during operation of the chest compression device, resulting in the slot 62 floating or moving to accommodate various positions or angles of the belt through the aperture 60 and/or through the slot, and/or to adjust or maintain the belt angle relative to the aperture, slot and/or housing. This configuration helps to minimize belt wear due to friction regardless of patient size. The machine guard may also include one or more of the features of FIGS. 6 and 7. In certain embodiments, the plate may move medially and/or laterally and/or upward/downward and/or in a caudal/pedal manner FIGS. 25 and 26 illustrate a machine guard having a moveable slot through which a compression belt is inserted. The machine guard is configured to rotate about a lower hinge point, to adjust the belt slot medially and/or laterally relative to a patient on a chest compression device, to position the belt for patients of different size, to minimize friction between the belt and the inner surfaces of the slot. The machine guards of FIGS. 25 and 26 are suitable for use in the housing illustrated in FIGS. 1 through 3 and with the compression belt assemblies described herein. The machine guard 16 of FIGS. 25 and 26 includes the generally L-shaped, "vertical" lateral (or second) portion 16V configured to fit within the lateral side of the housing aperture and a "horizontal" anterior (or first) portion 16A configured to fit within the anterior portion of the housing aperture. Other shapes are also contemplated. The machine guard 16 may include a lower fastener component 20 configured to engage a latch component e.g., in the form of a long ridge, disposed along the inside of the lateral housing surface, and a slot 21 for receiving the belt end 19. In this embodiment of the machine guard, a lower fastener component and corresponding latch component in the housing form a hinged connection 64 between the machine guard and the housing, so that the entire machine guard (or at least a portion) can rotate about the hinge point. (The upper fastener component 19 may be omitted.) As with the previous figures, the belt may include a pin or other connector 18, secured to the belt end disposed on the inner side of the machine guard.

The machine guard of FIGS. 25 and 26 may include sidewalls 65, extending medially and/or posteriorly from the inferior and superior edges of the machine guard. The anterior portion of the machine guard is configured to slide or float within corresponding channels or rails within the anterior portion of the apertures 14 in the chest compression device housing or within and/or over apertures 14 having no channels or rails. When installed within and/or over the aperture of the housing, prior to or during operation of the chest compression device, the machine guard will be operable to rotate about the hinged connection 64, while the anterior portion translates medially and/or laterally within and/or over the aperture of the housing, to move or float the slot 21 medially and/or laterally and/or upward/downward and/or in a caudal/pedal manner to accommodate the desired lateral/medial positions of the belt and slot to accommodate patients of different sizes. The slot 21 may move or float medially and/or laterally and/or in a caudal/pedal manner to accommodate various positions or angles of the belt through the slot, and/or to adjust or maintain the belt angle relative to the slot and/or housing. This configuration helps to minimize belt wear due to friction regardless of patient size. The machine guard may also include one or more of the features of FIGS. 6 and 7.

The machine guards having a movable slot described herein can accommodate patients of different sizes, while reducing or minimizing friction and rubbing of the belt against the slot edges. The ideal slot position for the smallest patient may be significantly more medial or closer to the longitudinal axis of the chest compression device than the largest patient (e.g., differing by about 15 mm), and the movable slot may accommodate this range of positions. The movable slot also allows for movement of the slot medially and/or laterally or back and forth during each compression to accommodate the changing angle of the belt with each compression, thereby reducing or minimizing friction and rubbing of the belt against the slot edges. Various guards having movable slots described herein may allow for movement of the slot medially/laterally and/or in a caudal/pedal manner. The machine guards having a movable slot described herein may further include any of the first and or second sensor components described herein for example from a magnetic sensor, a contact relay, a contact switch, a capacitive sensor, an inductive sensor, an optical sensor, and an ultrasonic sensor.

The several embodiments have been described in the context of a symmetrical CPR chest compression device, illustrated in embodiments which include various components in matching left and right pairs. However, the benefits of the various configurations of components may be achieved in asymmetric embodiments. For example, the benefits of the belt end configuration with the pin, machine guard slidably secured to the belt ends or pull straps, and/or the liner sock secured to the machine guard, can be obtained by applying those features to one side of the belt, while the other side of the belt is configured for attachment to its corresponding drive spool through other means. Likewise, the benefits of the drive spool configuration, with the channel for receiving the pin and the slidable flange for capturing the pin, can be applied by applying those features to one drive spool, while the other drive spool is configured for attachment to its corresponding belt end through other means.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A compression belt apparatus configured for releasable attachment to a chest compression device, said compression belt apparatus comprising:
- a compression belt;
- a guard configured to couple to a platform of the chest compression device, wherein the guard comprises
  - a first fastening element configured to releasably couple to a second fastening element of the platform,
  - an extension extending from the first fastening element and configured to be received in the platform to ensure proper orientation of the guard when the first fastening element of the guard is coupled to the platform, and
  - a sensor component housing disposed on a surface of the extension; and
- a first sensor component of an attachment sensing system disposed in the sensor component housing, wherein
  - the first sensor component is configured to operate with a second sensor component disposed in or on the platform of the chest compression device to enable detection of attachment of the guard to the platform.

2. The compression belt apparatus of claim 1, wherein the first sensor component is disposed in a channel of the sensor component housing.

3. The compression belt apparatus of claim 1, wherein the first sensor component is a component of a magnetic sensor, a contact relay, a contact switch, a capacitive sensor, an inductive sensor, an optical sensor, or an ultrasonic sensor.

4. The compression belt apparatus of claim 1, wherein the guard comprises a translatable belt slot for slidably engaging the compression belt.

5. The compression belt apparatus of claim 4, wherein the guard further comprises:
- a first portion comprising an opening larger than the translatable belt slot;
- a second portion; and
- a plate slidably disposed over the opening of the first portion, wherein
- the plate comprises the translatable belt slot.

6. The compression belt apparatus of claim 1, wherein the guard is slidably disposed on the compression belt.

7. The compression belt apparatus of claim 1, wherein the guard is configured to occupy an aperture in the platform of the chest compression device.

8. The compression belt apparatus of claim 1, wherein the first sensor component is a magnet and the second sensor component is a magnetic sensor.

9. A system for performing automated chest compressions, the system comprising:
- an automated chest compression device comprising
  - a platform comprising a first fastening element, and
  - a first sensor component of an attachment sensing system;
- a compression belt; and
- a guard configured to slidably engage with the compression belt and to couple to the platform of the chest compression device, wherein the guard comprises
  - a second fastening element configured to releasably secure the guard to the first fastening element of the chest compression device,
  - an extension extending from the second fastening element configured to be received in the platform when the second fastening element is secured to the first fastening element, and
  - a second sensor component of the attachment sensing system, the second sensor component being disposed in or on the extension of the guard;
- wherein
  - the first sensor component is disposed in or on the platform of the chest compression device proximate a location of the coupling of the guard to the platform, and
  - the first sensor component is configured to operate with the second sensor component to enable detection of attachment of the guard to the platform.

10. The system of claim 9, wherein each of the first sensor component and the second sensor component is a component of a magnetic sensor, a contact relay, a contact switch, a capacitive sensor, an inductive sensor, an optical sensor, or an ultrasonic sensor.

11. The system of claim 9, wherein the guard is configured to occupy an aperture in the platform of the chest compression device.

12. The system of claim 9, wherein the guard comprises a slot for slidably engaging the compression belt.

13. The system of claim 9, wherein the chest compression device further comprises a control system for controlling operation of the compression belt responsive at least in part to at least one signal from the attachment sensing system detecting attachment of the guard to the chest compression device.

14. The system of claim 13, wherein:
- the control system is configured to repeatedly cause the compression belt to tighten and loosen; and
- the tightening and loosening is rendered inoperable due to failure to detect attachment of the guard to the chest compression device.

15. The system of claim 9, wherein:
- the platform of the chest compression device comprises a first drive spool and a second drive spool; and the compression belt comprises a first belt end configured for releasable attachment to the first drive spool and a second belt end configured for releasable attachment to the second drive spool.

16. The system of claim 9, wherein the first sensor component is a magnetic sensor and the second sensor component is a magnet.

* * * * *